(12) United States Patent
Welch et al.

(10) Patent No.: US 11,655,896 B2
(45) Date of Patent: May 23, 2023

(54) SEALING EGRESS FOR FLUID HEAT EXCHANGE IN THE WALL OF A STRUCTURE

(71) Applicant: Emerson Climate Technologies, Inc., Sidney, OH (US)

(72) Inventors: Andrew M. Welch, Franklin, OH (US); Brian R. Butler, Centerville, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 116 days.

(21) Appl. No.: 17/211,664

(22) Filed: Mar. 24, 2021

(65) Prior Publication Data

US 2022/0307598 A1    Sep. 29, 2022

(51) Int. Cl.
| | | |
|---|---|---|
| *F16J 15/08* | (2006.01) | |
| *F25B 39/02* | (2006.01) | |
| *F25B 13/00* | (2006.01) | |

(52) U.S. Cl.
CPC ........... *F16J 15/0818* (2013.01); *F25B 13/00* (2013.01); *F25B 39/02* (2013.01)

(58) Field of Classification Search
CPC ......... F25B 13/00; F25B 39/02; F24F 1/0043; F24F 1/0057; F24F 1/0314; F24F 1/0323; F16J 15/0818
USPC .......................................................... 62/498
See application file for complete search history.

(56) References Cited

U.S. PATENT DOCUMENTS

| | | | |
|---|---|---|---|
| 6,041,613 A | 3/2000 | Morse et al. | |
| 8,336,321 B2 | 12/2012 | Cur et al. | |
| 10,047,985 B2 | 8/2018 | Kopko | |
| 10,174,975 B2 | 1/2019 | Feng et al. | |
| 10,371,428 B2 | 8/2019 | Kopko et al. | |
| 2006/0005558 A1 | 1/2006 | Otake et al. | |
| 2009/0139252 A1* | 6/2009 | Yamashita | ............ F24F 1/0063 62/259.1 |
| 2014/0196483 A1 | 7/2014 | Okazaki | |

(Continued)

FOREIGN PATENT DOCUMENTS

| | | | |
|---|---|---|---|
| CN | 208312704 U | 1/2019 | |
| EP | 3760936 A1 | 1/2021 | |
| WO | WO-2019167168 A1 * | 9/2019 | ............ F24F 1/0003 |

OTHER PUBLICATIONS

Pdf file is translation of foreign reference WO 2019167168 A1 (Year: 2019).*

(Continued)

*Primary Examiner* — Henry T Crenshaw
*Assistant Examiner* — Kamran Tavakoldavani
(74) *Attorney, Agent, or Firm* — Harness, Dickey & Pierce, P.L.C.

(57) ABSTRACT

An example refrigeration system includes an indoor fluid loop, an outdoor fluid loop, and a heat exchanger assembly. The indoor fluid loop circulates a first working fluid. The outdoor fluid loop circulates a second working fluid that is different from the first working fluid and is separated from the indoor fluid loop by a wall of a structure. The heat exchanger assembly is mounted within the wall of the structure. The heat exchanger assembly includes a heat exchanger and a housing, where the heat exchanger is disposed within an internal space defined by the housing. The housing supports the heat exchanger within the internal space and is mounted to a structure of the wall.

20 Claims, 14 Drawing Sheets

(56) References Cited

U.S. PATENT DOCUMENTS

| | | |
|---|---|---|
| 2014/0260404 A1 | 9/2014 | Verma et al. |
| 2016/0252289 A1 | 9/2016 | Feng et al. |
| 2016/0258657 A1 | 9/2016 | Feng et al. |
| 2017/0191705 A1 | 7/2017 | Sethi et al. |
| 2018/0195741 A1 | 7/2018 | Field et al. |
| 2019/0011194 A1* | 1/2019 | Mulinti ............... F24F 5/0075 |
| 2019/0376698 A1 | 12/2019 | Pirmez et al. |
| 2019/0376710 A1 | 12/2019 | Pirmez et al. |
| 2019/0376733 A1 | 12/2019 | Pirmez et al. |
| 2019/0390873 A1* | 12/2019 | Suzuki ..................... F25B 1/00 |

OTHER PUBLICATIONS

Pdf is translation of foreign reference WO-2019167168-A1 (Year: 2019).*
International Search Report regarding Application No. PCT/US2022/021395 dated Jun. 20, 2022.
Written Opinion of ISA regarding International Application No. PCT/US2022/021395 dated Jun. 20, 2022.

* cited by examiner

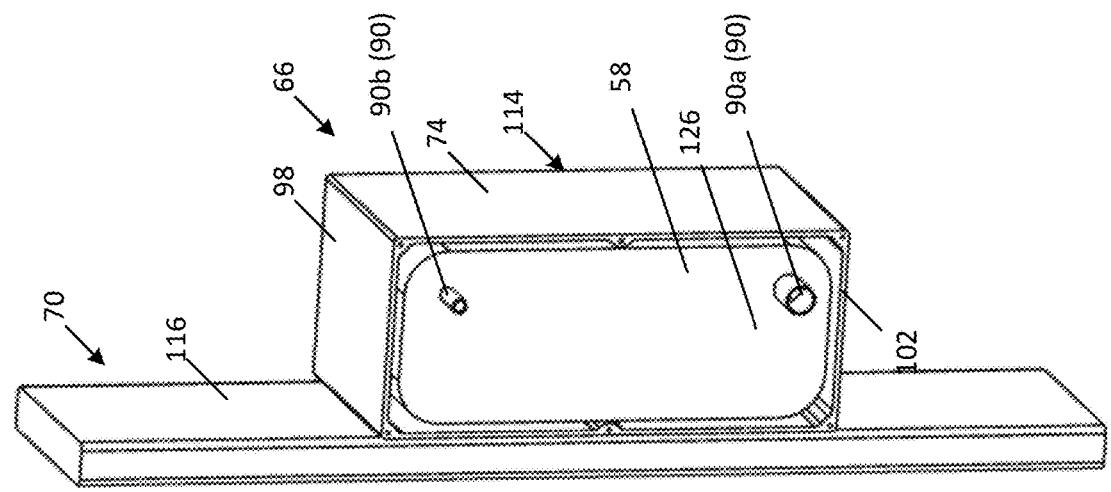
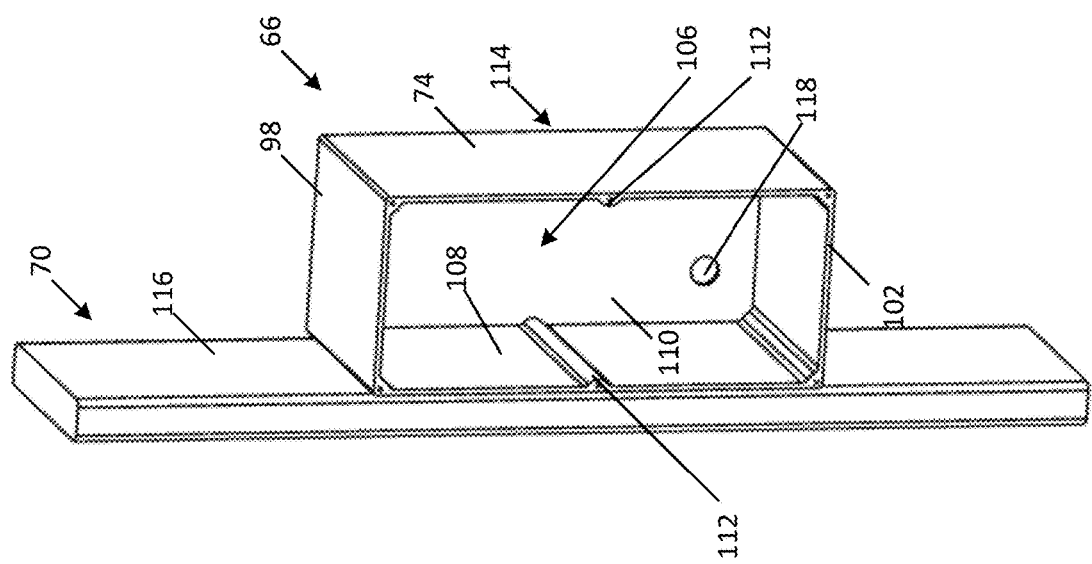

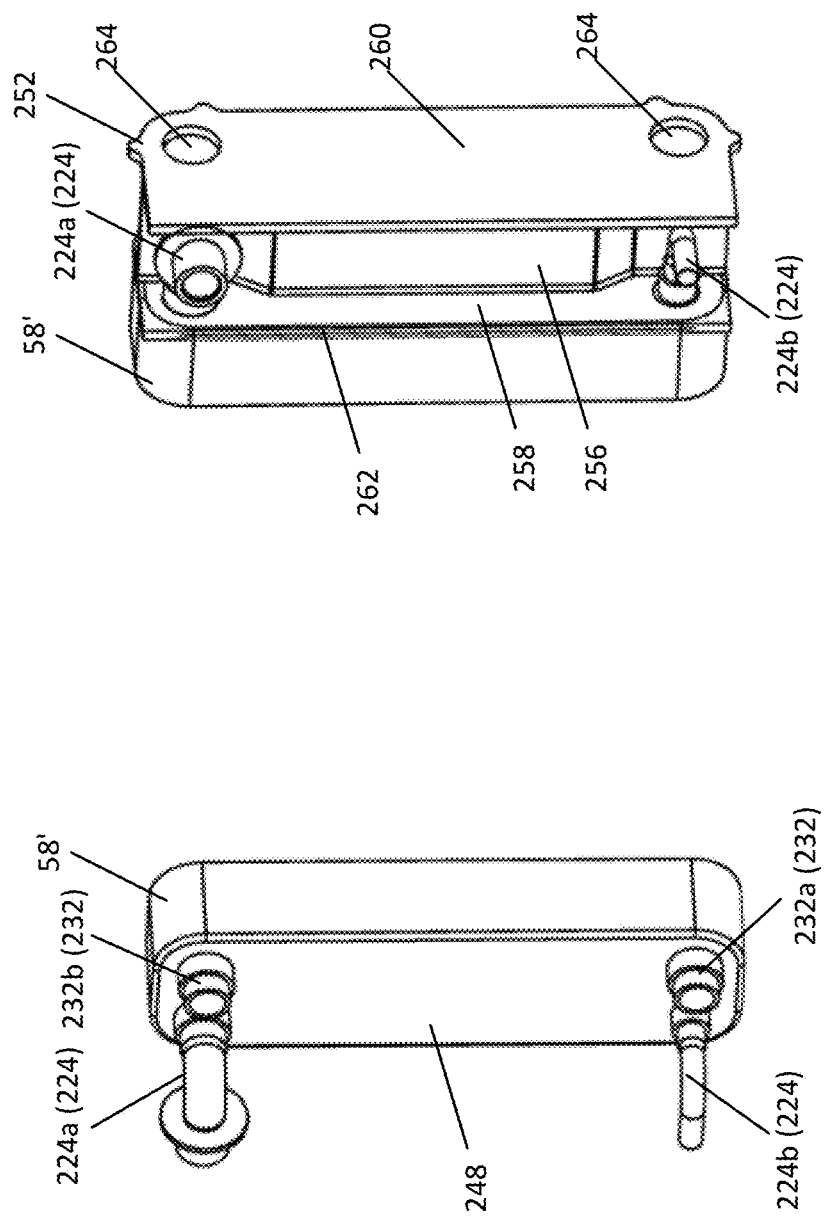

SEALING EGRESS FOR FLUID HEAT EXCHANGE IN THE WALL OF A STRUCTURE

FIELD

The present disclosure relates to refrigeration systems, and more particularly to a sealing egress for fluid heat exchange in the wall of a structure.

BACKGROUND

A residential or light commercial HVAC (heating, ventilation, and air conditioning) system controls temperature and humidity of a building. The systems are often divided between an indoor portion and an outdoor portion. With current HVAC systems moving toward use of low global warming potential (LGWP) refrigerants, splitting between portions of the system is becoming more common. Most LGWP refrigerants are more flammable than the refrigerants commonly used today. As used herein, flammable refrigerants are refrigerants with an American Society of Heating, Refrigerating and Air-conditioning Engineers, Inc. ("ASHRAE") safety group designation, also referred to herein as a "flammability classification," of A2L, B2L, A2, B2, A3, or B3. A flammable refrigerant can be a flammable refrigerant composed of a single flammable chemical species or a mixture or blend of at least one non-flammable refrigerant with at least one flammable refrigerant, or a blend of two or more flammable refrigerants, optionally combined with one or more non-flammable refrigerants.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An example refrigeration system according to the present disclosure includes an indoor fluid loop, an outdoor fluid loop, and a heat exchanger assembly. The indoor fluid loop circulates a first working fluid. The outdoor fluid loop circulates a second working fluid that is different from the first working fluid and is separated from the indoor fluid loop by a wall of a structure. The heat exchanger assembly is mounted within the wall of the structure. The heat exchanger assembly includes a heat exchanger and a housing, where the heat exchanger is disposed within an internal space defined by the housing. The housing supports the heat exchanger within the internal space and is mounted to a structure of the wall.

The heat exchanger may include a first pair of fluid connections that extend through a first face of the wall to an internal space in the structure and connect to the indoor fluid loop.

The heat exchanger may include a second pair of fluid connections that extend through a second face of the wall to an external environment and connect to the outdoor fluid loop.

The example refrigeration system may include a gasket disposed within the internal space of the housing and configured to seal the heat exchanger.

The example refrigeration system may include a spacer disposed within the housing. The spacer may be an H-shaped spacer and may include a first wall and a second wall, where the second wall extends orthogonal to the first wall. The first wall of the spacer may separate the first pair of fluid connections from the second pair of fluid connections.

One of the first pair of fluid connections and the second pair of fluid connections may extend through apertures in the second wall of the spacer.

The example refrigeration system may include a gasket disposed within the internal space of the housing that may be configured to seal the heat exchanger.

The housing may include an outer casing and a lid. The heat exchanger may be disposed within the outer casing. The gasket may be disposed between the heat exchanger and the lid.

The heat exchanger may include a first set of fluid connections and a second set of fluid connections. The first set of fluid connections may be in fluid communication with the indoor fluid loop, and the second set of fluid connections may be in fluid communication with the outdoor fluid loop. One of the first set of fluid connections and the second set of fluid connections may extend through the gasket and the lid.

The example refrigeration system may include a second gasket disposed between the heat exchanger and the outer casing. The gasket disposed between the heat exchanger and the lid may be a first gasket, and the heat exchanger may be disposed between the first gasket and the second gasket.

The heat exchanger may be one of a brazed-plate heat exchanger, a plate and frame heat exchanger, and a concentric tube heat exchanger.

The indoor fluid loop may include an indoor heat exchanger and a pump.

The outdoor fluid loop may include an outdoor heat exchanger and a compressor.

The indoor fluid loop may include a hot water storage tank and a pump.

The outdoor fluid loop may be in communication with an outdoor heat exchanger and an expansion valve disposed external to the wall of the structure.

An example thermal exchange system according to the present disclosure and configured to be mounted within a wall of a structure that isolates a fluid loop within the structure from a fluid loop external to the structure includes a housing, a heat exchanger, and a gasket. The housing defines an internal space and includes at least one fastener configured to secure the housing to a structure of the wall. The heat exchanger is supported within the internal space. The gasket seals the heat exchanger and internal space.

The example thermal exchanger system may include a first fluid inlet connection, a first fluid outlet connection, a second fluid inlet connection, and a second fluid outlet connection. The first fluid inlet connection and the first fluid outlet connection may be configured to be in fluid communication with the fluid loop within the structure and may be configured to direct flow of a first working fluid into and out of the heat exchanger. The second fluid inlet connection and the second fluid outlet connection may be configured to be in fluid communication with the fluid loop external to the structure and may be configured to direct flow of a second working fluid into and out of the heat exchanger.

The heat exchanger may be one of a brazed-plate heat exchanger, a plate and frame heat exchanger, and a concentric tube heat exchanger. The heat exchanger may include a first passage configured to direct the first working fluid to flow in a first direction and a second passage configured to direct the second working fluid to flow in a second direction opposite the first direction.

The example thermal energy system may include a spacer disposed within the internal space. The spacer may be an H-shaped spacer and may include a first wall and a second wall that extends orthogonal to the first wall. The first wall may separate the first fluid inlet connection and the first fluid outlet connection from the second fluid inlet connection and the second fluid outlet connection.

The example thermal energy system may include a second gasket sealing the heat exchanger and internal space. The housing may include an outer casing and a lid, the gasket may be a first gasket disposed between the heat exchanger and the lid, the second gasket may be disposed between the heat exchanger and the outer casing, and the heat exchanger may be disposed between the first gasket and the second gasket.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4 is a perspective view of an outer casing and gasket of the heat exchanger housing of FIG. 3.

FIG. 5 is a perspective view of a heat exchanger installed in the outer casing of the heat exchanger of FIG. 3.

FIG. 10 is a perspective view of a heat exchanger supported in the housing of FIG. 7.

FIG. 11 is a perspective view of a heat exchanger and spacer supported within the housing of FIG. 7.

In the drawings, reference numbers may be reused to identify similar and/or identical elements.

DETAILED DESCRIPTION

Figure 1A:
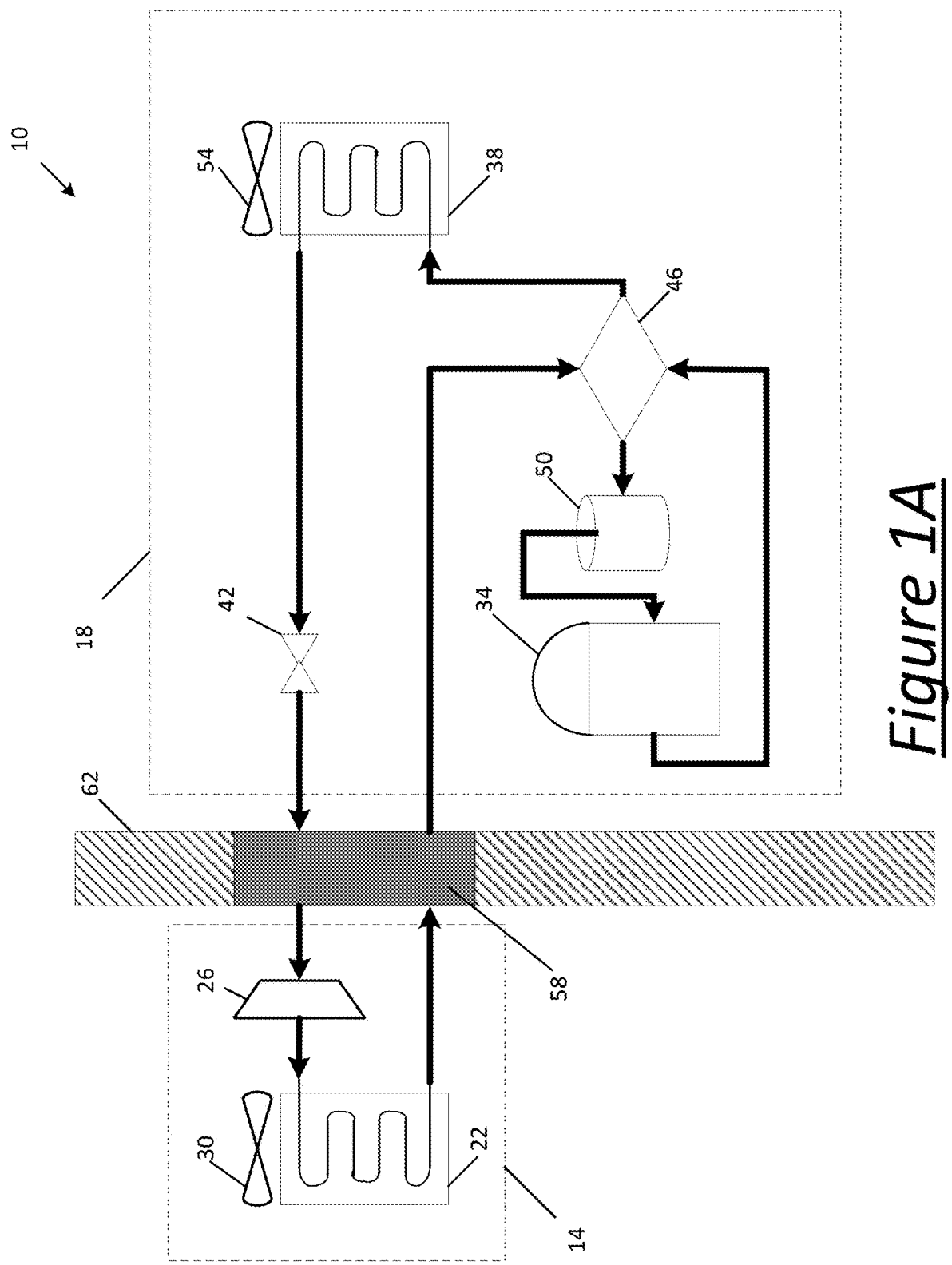
FIG. 1A is a schematic illustration of an example refrigeration system according to the present disclosure during a cooling mode.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides a heat exchange system for a temperature and/or humidity regulating system, such as a heating, ventilation, and air conditioning (HVAC) system, a heat-pump system, or a heating, ventilation, air conditioning, and refrigerant (HVAC&R) system. As referred to herein, such systems are referred to as refrigeration systems or refrigeration circuits that circulate a refrigerant. In certain aspects, however, the use of such term is also intended to encompass other heat transfer systems/circuits and heat transfer fluids.

Heating, ventilation, and air conditioning (HVAC) systems are often divided between an indoor portion and an outdoor portion. This is especially true in HVAC systems utilizing low global warming potential (LGWP) refrigerants. Most LGWP refrigerants are more flammable than the refrigerants commonly used today. As used herein, flammable refrigerants are refrigerants with an American Society of Heating, Refrigerating and Air-conditioning Engineers, Inc. ("ASHRAE") safety group designation, also referred to herein as a "flammability classification," of A2L, B2L, A2, B2, A3, or B3. A flammable refrigerant can be a flammable refrigerant composed of a single flammable chemical species or a mixture or blend of at least one non-flammable refrigerant with at least one flammable refrigerant, or a blend of two or more flammable refrigerants, optionally combined with one or more non-flammable refrigerants.

Often in HVAC systems using LGWP refrigerants, a fluid loop circulating a working fluid containing an LGWP refrigerant is isolated outside of a building or housing structure for safety reasons. A separate fluid loop within the building or housing structure circulates a non-flammable working fluid, such as water. The secondary loops (within the structure) are used for distribution because of the high heat capacity of water compared to air. Additionally, the water in the secondary loops is non-flammable compared to flammable LGWP or toxic working fluid in the main loop or outside loop (external to the structure). Using water outdoors typically requires the use of an anti-freezing agent that reduces the heat capacity and increases the viscosity of the water solution, resulting in poor heat transfer and the need for additional pumping power.

Although the system in the disclosure is described as an HVAC system having separate fluid loops inside and outside of a building, it is understood that the disclosure is not limited to this type of system. The present disclosure may be applied to any refrigerant, HVAC, heat pump, HVAC&R, or other system isolating an outside working fluid from an inside working fluid. Another example of this type of system may be a transport refrigerant application.

Even in refrigeration systems that do not circulate LGWP refrigerants, a portion of the system is often outside of the building or housing structure (for example, an outdoor coil, etc.) and a portion of the system is inside of the building or housing structure (for example, an indoor coil, etc.).

In either situation, there is a need for the fluid to either exchange heat within, or pass through, the walls (or inside of) the building or housing structure. When working fluids that are acceptable in fluid lines outside of the structure must transfer heat to or from a working fluid inside the structure, it can become important to seal the two spaces. In one example, water may flow through a fluid loop indoors. The water fluid loop must be protected from freezing due to contact with cold, ambient air. A highly flammable refrigerant may flow through a fluid loop on the outdoor side. The egress described herein allows the spaces to be sealed against receiving fluid from the opposing space fluid loop and prevent water in the heat exchanger from freezing.

A gasketed housing, as described herein, may be an egress that is mounted within the walls of the building or housing structure. The gasketed housing is a beneficial improvement over systems that simply run pipes through the structure or systems that exchange heat on an inside of the building or housing structure. The gasketed housing provides a sealed brazed-plate heat exchanger, or other type of heat exchanger, installed in an exterior wall to keep the outside fluid loop from entering the building or housing structure and keep the inside fluid loop internal to the structure to avoid the use of anti-freezing agents.

The gasketed housing provides a heat exchange system between an internal fluid loop and an external fluid loop such that the internal fluid loop and the external fluid loop may be contained in separate environmental spaces and sealed therebetween. The gasketed housing includes a heat exchanger (such as a brazed-plate heat exchanger, for example) of an easily contained shape, a housing to contain the heat exchanger and the heat exchanger fluids, and components for sealing.

The gasketed housing may be applied to the refrigerant of an HVAC system that is flammable or toxic and a secondary cooling or heating fluid such as water with a potential to freeze outside. The gasketed housing may be applied to the refrigerant of a heat pump water heater that is flammable or includes toxic heating water. The gasketed housing may include a double-wall brazed-plate heat exchanger, a plate and frame heat exchanger, or another heat exchanger with a high rate of exchange for its physical envelope to allow use of water in exchange with refrigerant or other working fluid. In some examples, the water may be a potable water for use in a hot water tank. In alternative examples, the water may not need to be a potable water. A low power heater may be installed with the heat exchanger to prevent freezing where one environment may be cold. The gasketed housing may be used where one or more fluid pumps can be automatically operated in response to a setpoint in temperature, pressure, or time.

The seal of the gasketed housing may be o-rings or gaskets that seal between the housing and the heat exchanger and/or between multiple components of the housing. The exterior connection to the gasketed housing is made outside of the building or housing structure and is preferably outside of the outer shell of the exterior wall. The design of the gasketed housing enables simple installation using common practices for the housing of electrical connections, and the gasketed housing may be installed either during framing of the building structure or as a retrofit.

Figure 1B:
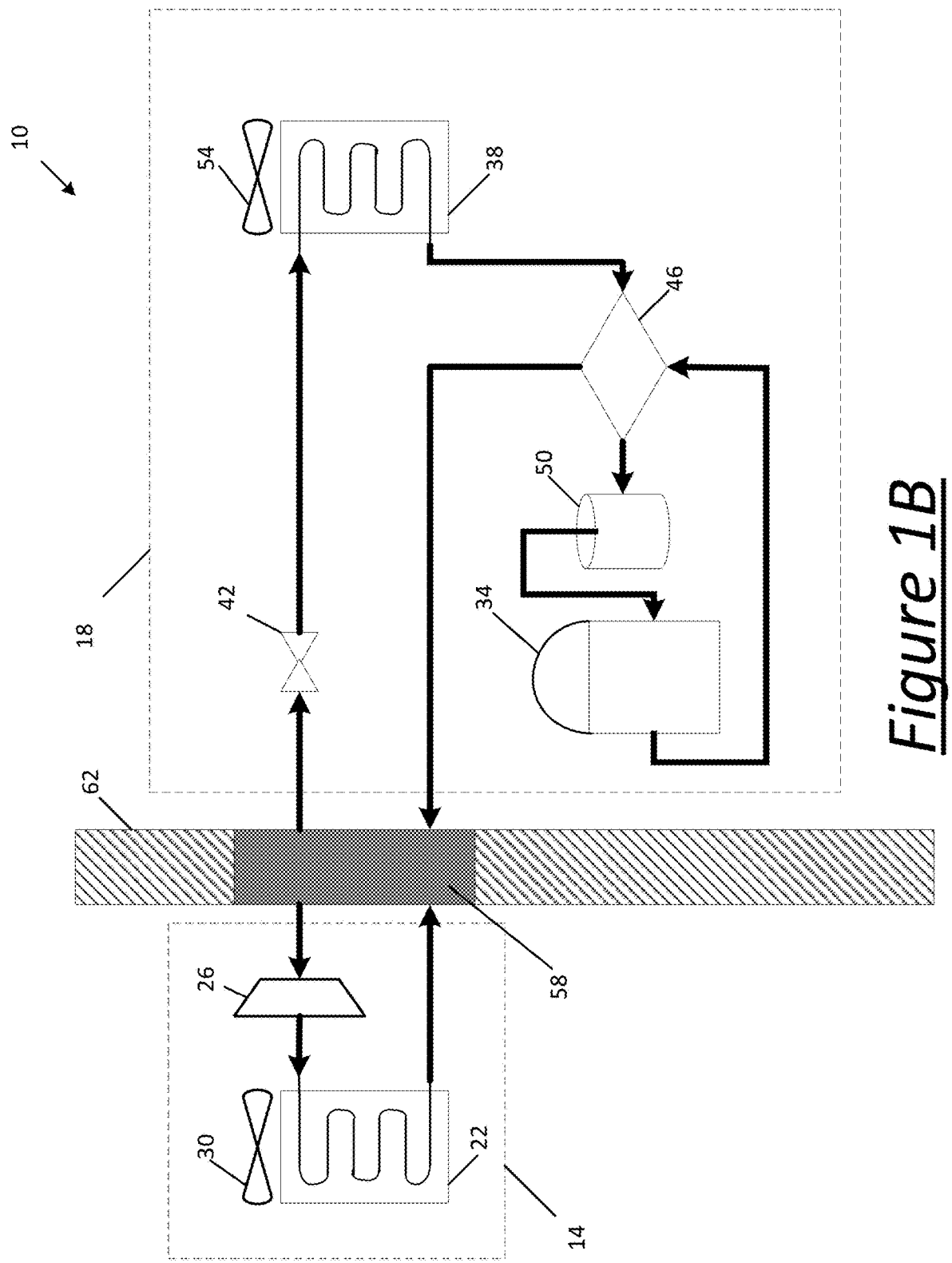
FIG. 1B is a schematic illustration of the example refrigeration system of FIG. 1A during a heating mode.

Now referring to FIGS. 1A and 1B, an example refrigeration system 10 includes an indoor fluid loop 14 and an outdoor fluid loop 18. For example, the refrigeration system 10 may be an HVAC system or a heat-pump system. The refrigeration system 10 may be operable in a cooling mode (FIG. 1A) and in a heating mode (FIG. 1B).

The indoor fluid loop 14 may be isolated within a structure of a building and may circulate a first working fluid. The outdoor fluid loop 18 may be isolated outside of the structure of the building and may circulate a second working fluid. For example, the first working fluid may be different from the second working fluid. Alternatively, the first working fluid may be the same as the second working fluid.

The first working fluid may be a non-flammable working fluid. For example, the first working fluid may be water. Alternatively, the first working fluid may contain a non-flammable or non-toxic refrigerant. In certain variations, exemplary non-flammable refrigerants include those selected from the group consisting of: saturated or unsaturated fluorocarbons, chlorofluorocarbons, hydrochlorofluorocarbons, fluoroethers, hydrocarbons, carbon dioxide, ammonia, dimethyl ether, and combinations thereof.

The second working fluid may include a refrigerant that is different from the first working fluid. For example, the refrigerant may be a low global warming potential (LGWP) refrigerant. The LGWP refrigerant may be a flammable refrigerant. As used herein, flammable refrigerants are refrigerants with an American Society of Heating, Refrigerating and Air-conditioning Engineers, Inc. ("ASHRAE") safety group designation, also referred to herein as a "flammability classification," of A2L, B2L, A2, B2, A3, or B3. A flammable refrigerant can be a flammable refrigerant composed of a single flammable chemical species or a mixture or blend of at least one non-flammable refrigerant with at least one flammable refrigerant, or a blend of two or more flammable refrigerants, optionally combined with one or more non-flammable refrigerants.

Flammable refrigerants may generally be gases in the methane series, ethane series, ethers, propane, ammonia, organic compounds, including unsaturated organic compounds, inorganic compounds, and refrigerant blends. More specifically, flammable refrigerants may include: hydrocarbons, hydrochlorofluorocarbons (phased out by Montreal Protocol in member countries), hydrofluorocarbons, hydrochlorocarbons, and hydrofluoroolefins, by way of example. The isolation outside of the built environment by the principles of the present disclosure is particularly useful for flammable hydrofluorocarbon refrigerants, and/or flammable hydrofluoroolefin refrigerants or any combinations thereof.

Non-limiting examples of flammable refrigerants include the following refrigerants: saturated hydrocarbons, like methane (R50), ethane (R170), propane (R290), butane (R600), pentane (R601), 2-methylpropane (R600a), 2 methylbutane (R601a), unsaturated hydrocarbons, such as ethene (R1150), propene (R1270), or heteroatom substituted hydrocarbons, such as methoxymethane (RE170), and methyl formate (R611), hydrochlorocarbons, hydrochlorofluorocarbons, such as 1 chloro-1,1-difluoroethane (R142b), saturated hydrofluorocarbons, like difluoromethane (R32), difluoroethane (R152a), fluoroethane (R161), 1,1,1-trifluoroethane (R143a), 1,1-difluoroethane (R152a), 1,1,1-trifluoroethane (R143a), hydrofluoroolefins (HFO) refrigerants include 3,3,3,-trifluoropropene (HFO-1234zf), HFO-1234 refrigerants like 2,3,3,3,-tetrafluoropropene (HFO-1234yf), 1,2,3,3,-tetrafluoropropene (HFO-1234ze(E)), cis- and trans-1,3,3,3,-tetrafluoropropene (HFO-1234ye(E),(Z)), pentafluoropropenes (HFO-1225) such as 1,1,3,3,3, pentafluoropropene (HFO-1225zc) or those having a hydrogen on the terminal unsaturated carbon such as 1,2,3,3,3, pentafluoropropene (HFO-1225ye(Z), fluorochloropropenes such as trifluoro, monochloropropenes (HFO-1233) like CF3CCl=CH2 (HFO-1233xf) and CF3CH=CHCl (HFO-1233zd), hydrogen (R702), ammonia (R717), refrigerant blends, such as, for example, R403A, R406A, R411A, R411B, R412A, R413A, R415A, R415B, R418A, R419A, R419B, R429A, R430A, R431A, R432A, R433A, R433B, R433C, R435A, R436A, R436B, R436C, R439A, R440A, R441a, R443A, R444A, R444B, R445A, R446A, R447A, R447B, R451A, R451B, R452B, R454A, R454B, R454C, R455A, R457A, R459A, R459B, R462A, R510A, R511A, R512A, R513A, and combinations thereof. For example only, certain flammable refrigerants may include a hydrofluoroolefin (HFO) Blend 1 having a mixture of the following:

difluoromethane (R32)
    1,2,3,3,-tetrafluoropropene (HFO-1234ze(E))
    3,3,3,-trifluoropropene (HFO-1234zf)
    difluoroethane (R152a))

or a hydrofluoroolefin (HFO) Blend 2 having a mixture of the following:

difluoromethane (R32)
    trans 1-chloro-3,3,3-trifluoropropene HFO-1233zd(E)
    3,3,3,-trifluoropropene (HFO 1234zf)).

In certain variations, the flammable refrigerant is selected from difluoromethane (R32).

LGWP refrigerants pose greater risks than non-flammable refrigerants, especially in confined spaces and indoor applications. Thus, it is desirable to isolate the fluid loop containing the LGWP refrigerant in a location external to homes and businesses for safety.

The indoor fluid loop 14 includes an indoor heat exchanger 22 and a pump 26 and circulates a first working fluid. The indoor fluid loop 14 may circulate the first working fluid in a first direction in both the cooling mode (FIG. 1A) and the heating mode (FIG. 1B).

The pump 26 may pump the first working fluid through the indoor heat exchanger 22 and through a complete circulation of the indoor fluid loop 14. For example, the pump 26 may be any suitable pump. The pump 26 provides the first working fluid to the indoor heat exchanger 22 in both the cooling mode (FIG. 1A) and the heating mode (FIG. 1B).

In the cooling mode (FIG. 1A), the first working fluid absorbs heat in the indoor heat exchanger 22. Liquid working fluid increases in temperature as it removes heat from the indoor environment. The indoor heat exchanger 22 may include an electric fan 30 that increases the rate of heat transfer to the first working fluid. The heat is removed from air flowing across the indoor heat exchanger 22 and the resulting cooled air is circulated through the building. The indoor heat exchanger 22 may be a liquid-to-air heat exchanger, such that the first working fluid does not change phase in the indoor heat exchanger 22. The indoor heat exchanger 22 may be a finned tube heat exchanger, a microchannel heat exchanger, or any other type of heat exchanger.

In the heating mode (FIG. 1B), the first working fluid disperses heat to the indoor environment from the indoor heat exchanger 22. The first working fluid decreases in temperature as heat is absorbed by the air in the indoor environment. The electric fan 30 of the indoor heat exchanger 22 may increase the rate of heat transfer away from the first working fluid. The heat is absorbed by the air flowing across the indoor heat exchanger 22 and the resulting heated air is circulated through the building.

The outdoor fluid loop 18 may include a compressor 34, an outdoor heat exchanger 38, an expansion valve 42, a reversing valve 46, and a suction line accumulator 50. The compressor 34 receives the working fluid in vapor form from the suction line accumulator 50. The suction line accumulator 50 prevents compressor damage from a sudden surge of fluid that could enter the compressor 34. The compressor 34 compresses the working fluid, providing pressurized working fluid in vapor form to the reversing valve 46. The compressor 34 includes an electric motor and may be a scroll compressor or a reciprocating compressor.

In the cooling mode (FIG. 1A), all or a portion of the pressurized working fluid is converted into liquid form within the outdoor heat exchanger 38. The outdoor heat exchanger 38 transfers heat away from the second working fluid, thereby cooling the second working fluid. When the vapor is cooled to a temperature that is less than a saturation temperature, the second working fluid transforms into a liquid (or liquefied) working fluid. The outdoor heat exchanger 38 may include an electric fan 54 that increases the rate of heat transfer away from the second working fluid. The outdoor heat exchanger 38 may be a finned tube heat exchanger, a microchannel heat exchanger, or any other type of heat exchanger.

The outdoor heat exchanger 38 provides the second working fluid to the expansion valve 42. The expansion valve 42 controls the flow rate of the second working fluid. The expansion valve 42 may be a bi-directional valve such that the expansion valve 42 operates in both the heating mode and the cooling mode. Alternatively, the outdoor fluid loop 18 may include two expansion valves 42, two bypass lines, and two check valves, such that one bypass line and one expansion valve operates in each of the heating mode and the cooling mode, with the check valves operating to prevent flow to the unused expansion valve.

The expansion valve 42 may include a thermostatic expansion valve, may be controlled electronically by, for example, a system controller, or may be a fixed restriction, like a capillary tube. A pressure drop caused by the expansion valve 42 may cause a portion of the liquefied second working fluid to transform back into the vapor form.

In the heating mode (FIG. 1B), the pressurized working fluid from the compressor 34 is provided to the expansion valve 42 from the reversing valve 46. The expansion valve 42 controls the flow rate of the second working fluid. For example, the expansion valve 42 may receive the second working fluid in a liquefied form or in a mixed liquid-vapor form. The expansion valve 42 may increase the pressure of the second working fluid such that all or a portion of the second working fluid is converted into a liquefied form.

All or a portion of the pressurized working fluid is passed through the outdoor heat exchanger 38. The second working fluid absorbs heat in the outdoor heat exchanger 38. Liquid working fluid increases in temperature as it removes heat from the outdoor environment. The electric fan 54 may increase the rate of heat transfer to the second working fluid. The heat is removed from air flowing across the outdoor heat exchanger 38.

The working fluid of the indoor fluid loop 14 and the working fluid of the outdoor fluid loop 18 may exchange heat in a heat exchanger 58 mounted within a wall 62 of the structure of the building. During the cooling mode (FIG. 1A), the first working fluid of the indoor fluid loop 14 enters the heat exchanger 58 from the indoor heat exchanger 22, and the second working fluid of the outdoor fluid loop 18 enters the heat exchanger 58 from the expansion valve 42 in a liquid form or in a mixed liquid and vapor form. During the heating mode (FIG. 1B), the first working fluid of the indoor fluid loop 14 enters the heat exchanger 58 from the pump 26, and the second working fluid of the outdoor fluid loop 18 enters the heat exchanger 58 from the compressor 34, via the reversing valve 46, in a vapor form.

The heat exchanger 58 may be a concentric tube heat exchanger, a plate and frame heat exchanger, a flat plate heat exchanger, such as a brazed-plate heat exchanger, or any other type of heat exchanger. For purposes of simplicity, the heat exchanger 58 will be described as a brazed-plate heat exchanger. However, it is understood that the disclosure is not limited to the brazed-plate heat exchanger herein. The brazed-plate heat exchanger is used to transfer heat from one fluid to another through thin metal plates. The brazed-plate heat exchanger includes thin metal heat transfer plates that are stacked in superposed relation and sealed by brazing, providing the heat exchanger with a high heat transfer coefficient. For example, copper or nickel may be used as the brazing metal. Brazing metallurgically bonds the thin heat transfer plates at contact points throughout the plate stack. The multiple bonds cause the heat exchanger to be rigid. Additionally, the plate stack can withstand internal pressure without the use of any covers.

The plate stack includes ports and passages for the flow of the working fluid. The plate configuration improves refrigerant mixing in the working fluid. Working fluid from the indoor fluid loop 14 flows through a first side of the heat exchanger 58 and working fluid from the outdoor fluid loop 18 flows through a second, opposite side of the heat exchanger 58. In the cooling mode, the first working fluid from the indoor fluid loop 14 flows in a direction opposite a flow direction of the second working fluid from the outdoor fluid loop 18. The counter-flow operation accommodates a high temperature difference and enables the second working fluid from the outdoor fluid loop 18 to absorb the heat from the first working fluid of the indoor fluid loop 14. In the heating mode, the first working fluid from the indoor fluid loop 14 flows in a direction parallel with, or the same flow direction as, the flow direction of the second working fluid from the outdoor fluid loop 18.

Figure 2:
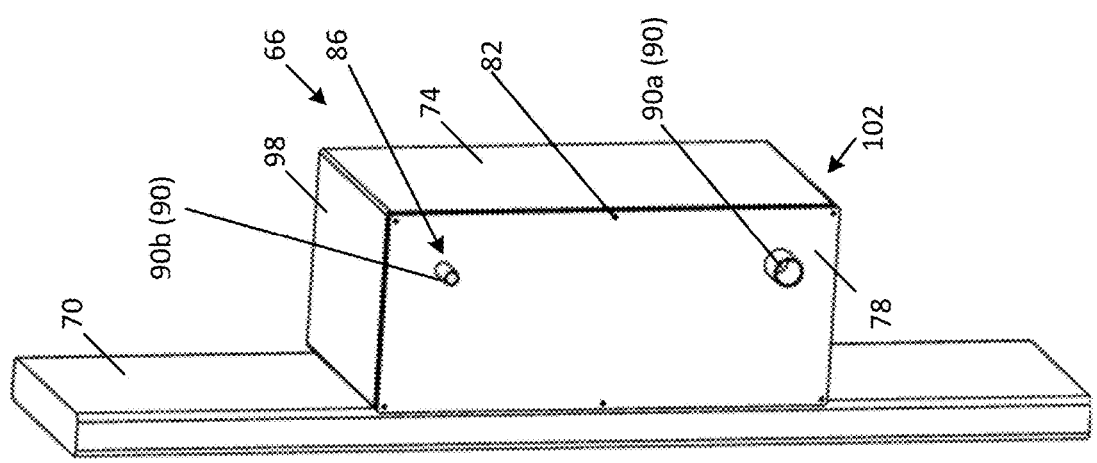
FIG. 2 is a perspective view of a heat exchanger housing mounted within a wall of an example refrigeration system.

Referring to FIG. 2, the heat exchanger 58 may be secured within a housing 66 that is mounted on, or fixed to, an exterior stud 70, a sheathing, an exterior wall, or other structure within the wall 62. For example, the housing 66 may be fixed to the exterior stud 70, sheathing, exterior wall, or other structure by fasteners (such as screws, bolts, nails, etc.), a rail and channel system, an adhesive, hook and loop fastener, or any other fixing or mounting strategy.

The housing 66 includes an outer casing 74. For example, the outer casing 74 may take on a rectangular shape or any shape that surrounds a perimeter of the heat exchanger 58. The housing 66 may include a lid 78 that seals the outer casing 74. The lid 78 may be secured on the outer casing 74 by at least one fastener 82. Alternatively, the lid 78 may be snap fit on the outer casing 74. Alternatively, the lid 78 may be secured on the outer casing 74 by any other securing method that allows the lid 78 to be removed for maintenance.

The outer casing 74 and lid 78 may be formed of a material suitable to be mounted to the exterior stud 70, the sheathing, the exterior wall, or other structure within the wall 62 and support the heat exchanger 58. The outer casing 74 and lid 78 may be formed of the same material or of different materials. For example, the outer casing 74 and lid 78 may be formed of a plastic, a thin metal, or any other suitable material.

Figure 3:
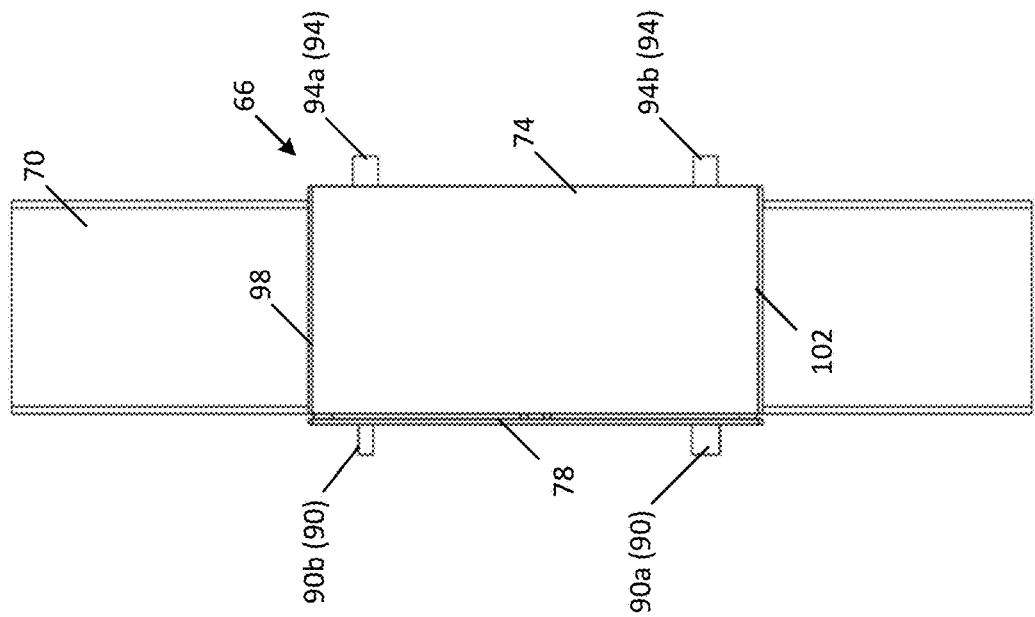
FIG. 3 is side view of the heat exchanger housing of FIG. 2.

Referring additionally to FIG. 3, the housing 66 may include apertures for connections 86 to the fluid lines. For example, a first set of connections 90 for the indoor fluid loop 14 may be inserted through the lid 78 on a first side of the housing 66 (and the first side of the heat exchanger 58), and a second set of connections 94 for the outdoor fluid loop 18 may be inserted through the outer casing 74 on a second side of the housing 66 (and the second side of the heat exchanger 58).

Alternatively, although it is not illustrated here, the first set of connections 90 for the indoor fluid loop 14 may be disposed on different sides of the housing. For example, the second set of connections 94 for the outdoor fluid loop should always be disposed on a side of the housing 66 facing the exterior wall of the structure. The first set of connections 90 for the indoor fluid loop 14 may be disposed on any side of the housing 66 except for the side facing the exterior wall of the structure.

The first set of connections 90 may include a fluid inlet connection 90a and a fluid outlet connection 90b. The fluid inlet connection 90a and the fluid outlet connection 90b may be disposed along a vertical axis parallel with a vertical, longitudinal axis of the housing 66. The fluid inlet connection 90a and the fluid outlet connection 90b may be spaced apart along the vertical axis, with one of the fluid inlet connection 90a and the fluid outlet connection 90b being disposed near a top 98 of the housing 66 and the other of the fluid inlet connection 90a and the fluid outlet connection 90b being disposed near a bottom 102 of the housing 66. For example, the fluid inlet connection 90a may be disposed near the bottom 102 of the housing 66 and the fluid outlet connection 90b may be disposed near the top 98 of the housing 66.

The second set of connections 94 may include a first fluid connection 94a and a second fluid connection 94b. In the cooling mode, the first fluid connection 94a may be a fluid inlet connection 94a and the second fluid connection 94b may be a fluid outlet connection 94b. In the heating mode, the first fluid connection 94a may be a fluid outlet connection 94a and the second fluid connection 94b may be a fluid inlet connection 94b. The first fluid connection 94a and the second fluid connection 94b may be disposed along a vertical axis parallel with a vertical, longitudinal axis of the housing 66. The first fluid connection 94a and the second fluid connection 94b may be spaced apart along the vertical axis, with one of the first fluid connection 94a and the second fluid connection 94b being disposed near the top 98 of the housing 66 and the other of the first fluid connection 94a and the second fluid connection 94b being disposed near the bottom 102 of the housing 66.

As previously stated, the heat exchanger 58 is structured such that the working fluid from the indoor fluid loop 14 flows in a direction opposite a flow direction of the working fluid from the outdoor fluid loop 18 during a cooling mode. The counter-flow operation accommodates a high temperature difference and enables the working fluid from the outdoor fluid loop 18 to absorb the heat from the indoor fluid loop 14. Accordingly, the first fluid connection 94a may be a fluid inlet and the second fluid connection 94b may be a fluid outlet, such that the fluid inlet and fluid outlet of the second set of connections 94 are disposed opposite the fluid inlet connection 90a and the fluid outlet connection 90b. For example, the first fluid connection 94a may be disposed near the top 98 of the housing 66 and the second fluid connection 94b may be disposed near the bottom 102 of the housing 66.

In the heating mode, as previously stated, the working fluid from the indoor fluid loop 14 flows in the same direction, or parallel with, a flow direction of the working fluid from the outdoor fluid loop 18. Thus, during the heating mode, the second set of connections 94 for the outdoor fluid loop 18 may switch, such that the first fluid connection 94a is a fluid outlet, and the second fluid connection 94b is a fluid inlet.

Referring to FIG. 4, the outer casing 74 may define an interior space 106. The interior space may support a first, or rear gasket 110. The rear gasket 110 may be placed directly adjacent a back wall 114 of the outer casing 74. The back wall 114 of the outer casing 74 may be disposed along a plane orthogonal to a face 116 of the exterior stud 70 (or sheathing, exterior wall, or other structure within the wall 62).

The outer casing 74 may include one or more ribs 112 disposed on an inner wall 108 of the outer casing 74. For example, there may be one rib 112 disposed in a center of opposing inner walls 108 of the outer casing. Alternatively, there may be more than one rib disposed on any of the inner walls 108 of the outer casing 74. The ribs 112 may be spacers that center the heat exchanger 58 within the outer casing 74. Additionally, the ribs 112 may position the heat exchanger 58 spaced from the outer casing 74 to limit heat transfer from the heat exchanger 58 to the outer casing 74 and provide a gap for a heater (not shown) to be positioned within the outer casing 74. Additionally, the ribs 112 may provide an interference fit with the gasket 110 to retain the gasket 110 and heat exchanger 58 in place. Additionally, the ribs 112 may provide structural rigidity to the outer casing 74.

The rear gasket 110 may seal and protect the heat exchanger 58 and the fluid entering and exiting the heat exchanger 58 through the connections 86, and, more specifically, the second set of connections 94 from the outdoor fluid loop 18. The rear gasket 110 may include apertures 118 for receiving the second set of connections 94. The rear gasket 110 may separate the outdoor environment from the environment within the interior space 106 and may insulate the heat exchanger 58 and interior space 106 from the outdoor temperature. The rear gasket 110 may be formed of any gasket material compatible with the working fluid from the outdoor fluid loop 18. For example, the gasket material may be an elastomer, such as neoprene or rubber, or any other gasket material.

Referring to FIG. 5, the interior space 106 may receive the heat exchanger 58 such that the heat exchanger 58 is supported by the housing 66, and, more specifically, the outer casing 74. The heat exchanger 58 may be disposed adjacent the rear gasket 110 with the second set of connections 94 extending through the apertures 118 in the rear gasket 110.

Figure 6:
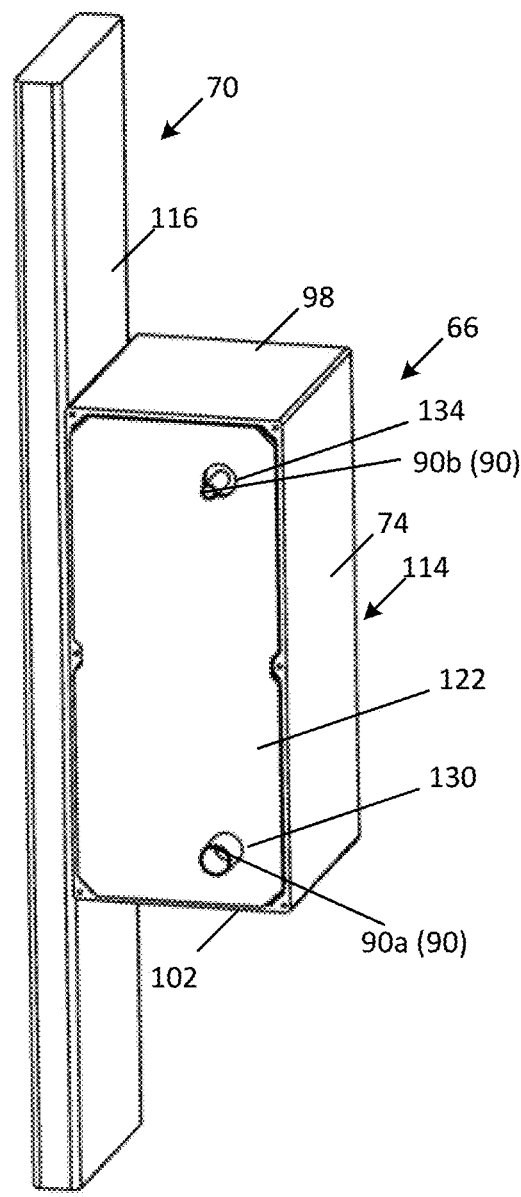
FIG. 6 is a perspective view of a heat exchanger and gasket in the outer casing of the heat exchanger of FIG. 3.

Referring to FIG. 6, a front gasket 122 may be directly adjacent to, and supported on, a first side or front face 126 of the heat exchanger 58, such that the front gasket 122 and the rear gasket 110 are disposed on opposing sides of the heat exchanger 58. The first set of connections 90 may extend through apertures 130 in the front gasket 122.

The front gasket 122 may seal and protect the heat exchanger 58 and the fluid entering and exiting the heat exchanger 58 through the connections 86, and, more specifically, the first set of connections 90 from the indoor fluid loop 14. The front gasket 122 may separate the indoor environment from the environment within the interior space 106 and may insulate the heat exchanger 58 and interior space 106 from the indoor space temperature. The front gasket 122 may cover the front face 126 of the heat exchanger 58. The front gasket 122 may be formed of any gasket material compatible with the working fluid from the indoor fluid loop 14. For example, the gasket material may be an elastomer, such as neoprene or rubber, or any other gasket material.

An o-ring or seal 134 may be disposed on top of the front gasket 122 (and rear gasket 110) between the front gasket 122 and the lid 78 (between the rear gasket 110 and back wall 114) to seal the aperture 130 around the connection 90. Alternatively, the aperture 130 in the front gasket 122 (and rear gasket 110) may fit tightly enough around the connection 90 that the front gasket 122 seals the aperture 130 without an additional seal.

Referring additionally to FIG. 2, the lid 78 may be fastened directly adjacent the front gasket 122. The front gasket 122, the heat exchanger 58, and the rear gasket 110 may be snugly secured by the lid 78 within the interior space 106 such that the front gasket 122, the heat exchanger 58, and the rear gasket 110 cannot move within the interior space 106. For example, the front gasket 122, the heat exchanger 58, and the rear gasket 110 may be snugly secured by the lid 78 such that the front gasket 122 and the rear gasket 110 may slightly compress when the lid 78 is secured on the outer casing 74.

Although it is not illustrated or described with respect to FIGS. 2-6, the housing 66 may additionally include a low power heating element to control the temperature within the interior space 106 and the heat exchanger 58.

Figure 7:
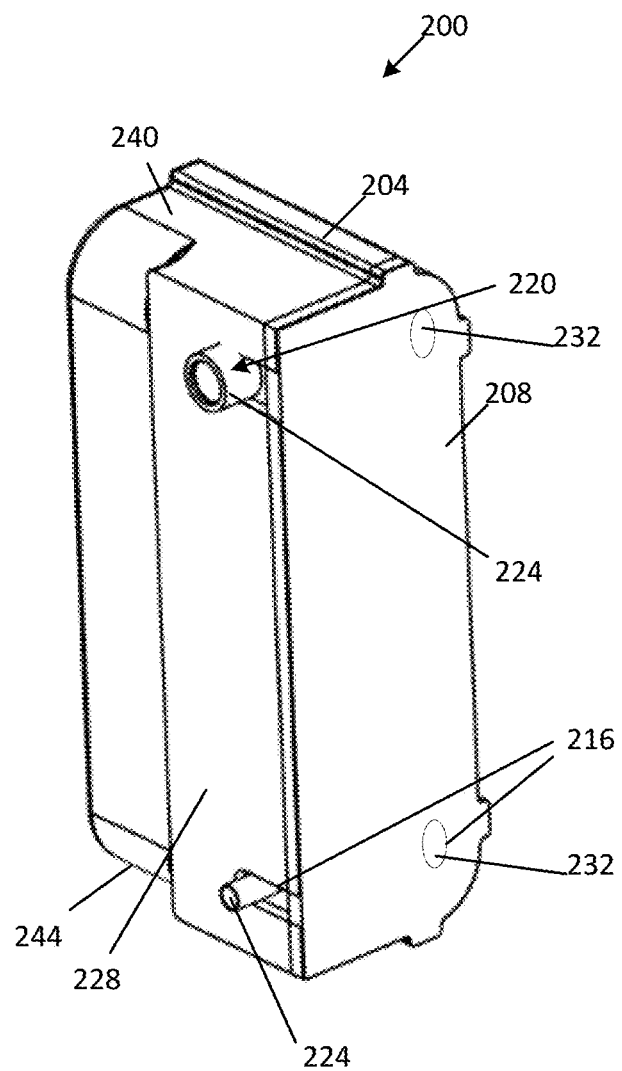
FIG. 7 is a perspective view of another heat exchanger housing for mounting within a wall of an example refrigeration system.

Now referring to FIG. 7, another example housing 200 securing the heat exchanger 58 is illustrated. The housing 200 is configured to be mounted on, or fixed to, the exterior stud 70, sheathing, exterior wall, or other structure within the wall 62. For example, similar to housing 66, the housing 200 may be fixed to the exterior stud 70, sheathing, exterior wall, or other structure by fasteners (such as screws, bolts, nails, etc.), a rail and channel system, an adhesive, hook and loop fastener, or any other fixing or mounting strategy.

The housing 200 includes an outer casing 204. For example, the outer casing 204 may take on a rectangular shape, an oval shape, an elongated shape, or any shape that surrounds a perimeter of the heat exchanger 58. The housing 200 may include a lid 208 that seals the outer casing 204. The lid 208 may be secured on the outer casing 204 by at least one fastener 212. Alternatively, the lid 208 may be snap fit on the outer casing 204. Alternatively, the lid 208 may be secured on the outer casing 204 by any other securing method that allows the lid 208 to be removed for maintenance.

The outer casing 204 and lid 208 may be formed of a material suitable to be mounted to the exterior stud 70 (or sheathing, exterior wall, or other structure within the wall 62) and support the heat exchanger 58. The outer casing 204 and lid 208 may be formed of the same material or of different materials. For example, the outer casing 204 and lid 208 may be formed of a plastic, a thin metal, or any other suitable material.

Figure 9:
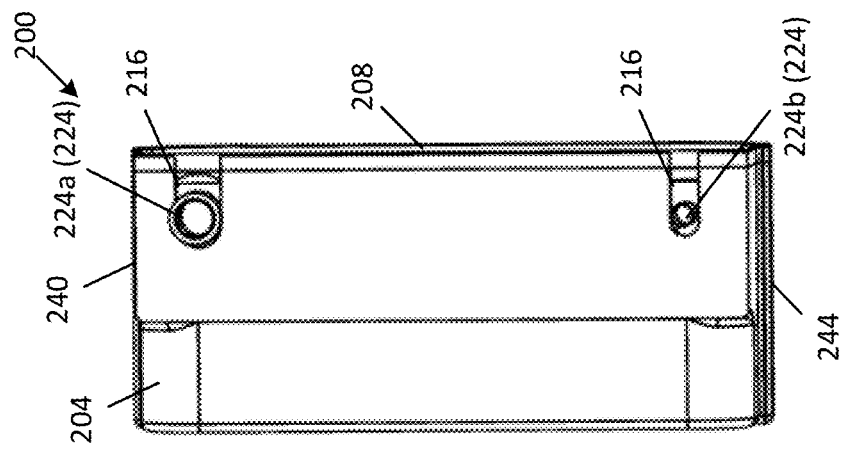
FIG. 9 is a side view of the heat exchanger housing of FIG. 7.
Figure 8:
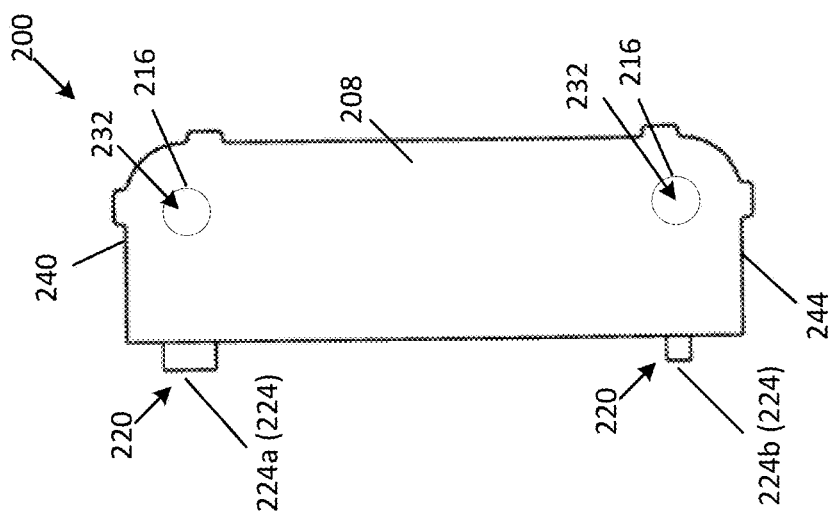
FIG. 8 is a front view of the heat exchanger housing of FIG. 7.

Referring additionally to FIGS. 8 and 9, the housing 200 may include apertures 216 for connections 220 to the fluid lines. For example, a first set of connections 224 for the indoor fluid loop 14 may be inserted through the outer casing 204 on a first side 228 of the housing 200 (and the first side of the heat exchanger 58), and a second set of connections 232 for the outdoor fluid loop 18 may be inserted through the lid 208.

Alternatively, although it is not illustrated here, the first set of connections 224 for the indoor fluid loop 14 may be disposed on different sides of the housing 200. For example, the second set of connections 232 for the outdoor fluid loop 18 should always be disposed on a side of the housing 200 facing the exterior wall of the structure. The first set of connections 224 for the indoor fluid loop 14 may be disposed on any side of the housing 200 except for the side facing the exterior wall of the structure.

The first set of connections 224 may include a fluid inlet connection 224a and a fluid outlet connection 224b. The fluid inlet connection 224a and the fluid outlet connection 224b may be disposed along a vertical axis parallel with a vertical, longitudinal axis of the housing 200. The fluid inlet connection 224a and the fluid outlet connection 224b may be spaced apart along the vertical axis, with one of the fluid inlet connection 224a and the fluid outlet connection 224b being disposed near a top 240 of the housing 200 and the other of the fluid inlet connection 224a and the fluid outlet connection 224b being disposed near a bottom 244 of the housing 200. For example, the fluid inlet connection 224a may be disposed near the top 240 of the housing 200 and the fluid outlet connection 224b may be disposed near the bottom 244 of the housing 200.

The second set of connections 232 may include a first fluid connection 232a and a second fluid connection 232b. The first fluid connection 232a and the second fluid connection 232b may be disposed along a vertical axis parallel with a vertical, longitudinal axis of the housing 200. The first fluid connection 232a and the second fluid connection 232b may be spaced apart along the vertical axis, with one of the first fluid connection 232a and the second fluid connection 232b being disposed near the top 240 of the housing 200 and the other of the first fluid connection 232a and the second fluid connection 232b being disposed near the bottom 244 of the housing 200.

As previously stated, during the cooling mode the heat exchanger 58 is structured such that the working fluid from the indoor fluid loop 14 flows in a direction opposite a flow direction of the working fluid from the outdoor fluid loop 18. The counter-flow operation accommodates a high temperature difference and enables the working fluid from the outdoor fluid loop 18 to absorb the heat from the indoor fluid loop 14. Accordingly, the first fluid connection 232a may be a fluid inlet connection and the second fluid connection 232b may be a fluid outlet connection, with the first fluid connection 232a and the second fluid connection 232b disposed opposite the fluid inlet connection 224a and the fluid outlet connection 224b. For example, the first fluid connection 232a may be a fluid inlet disposed near the bottom 244 of the housing 200 and the second fluid connection 232b may be a fluid outlet disposed near the top 240 of the housing 200.

In the heating mode, as previously stated, the working fluid from the indoor fluid loop 14 flows in the same direction, or parallel with, a flow direction of the working fluid from the outdoor fluid loop 18. Thus, during the heating mode, the second set of connections 232 for the outdoor fluid loop 18 may switch, such that the first fluid connection 232a is a fluid outlet, and the second fluid connection 232b is a fluid inlet.

Referring to FIG. 10, an example heat exchanger 58' housed within housing 200 is illustrated. Heat exchanger 58' may be the same as, or similar to, heat exchanger 58. The first set of connections 224 may be connected to a fluid inlet and a fluid outlet of the indoor fluid loop 14 at the fluid inlet connection 224a and the fluid outlet connection 224b, respectively. The second set of connections 232 may be connected to the outdoor fluid loop 18 at the first fluid connection 232a and the second fluid connection 232b.

The heat exchanger 58' may be a concentric tube heat exchanger, a plate and frame heat exchanger, a flat plate heat exchanger, such as a brazed-plate heat exchanger, or any other type of heat exchanger. For purposes of simplicity, the heat exchanger 58 may be described as a brazed-plate heat exchanger. However, it is understood that the disclosure is not limited to the brazed-plate heat exchanger herein. The connections 224 and 232 may be arranged on a single face 248 of the heat exchanger, as opposed to being arranged on separate sides or on opposing sides of the heat exchanger.

The heat exchanger 58' may be structured so that, in the cooling mode, the working fluid from the indoor fluid loop 14 flows in a direction opposite a flow direction of the working fluid from the outdoor fluid loop 18. The counter-flow operation accommodates a high temperature difference and enables the working fluid from the outdoor fluid loop 18 to absorb the heat from the indoor fluid loop 14. Accordingly, the first fluid connection 232a may be a fluid inlet and the second fluid connection 232b may be a fluid outlet disposed opposite the fluid inlet connection 224a and the fluid outlet connection 224b.

In the heating mode, the working fluid from the indoor fluid loop 14 flows in the same direction, or parallel with, the working fluid from the outdoor fluid loop 18. Accordingly the first fluid connection 232a may be a fluid outlet and the second fluid connection 232b may be a fluid inlet disposed on the same ends as the fluid inlet connection 224a and the fluid outlet connection 224b.

Figure 12:
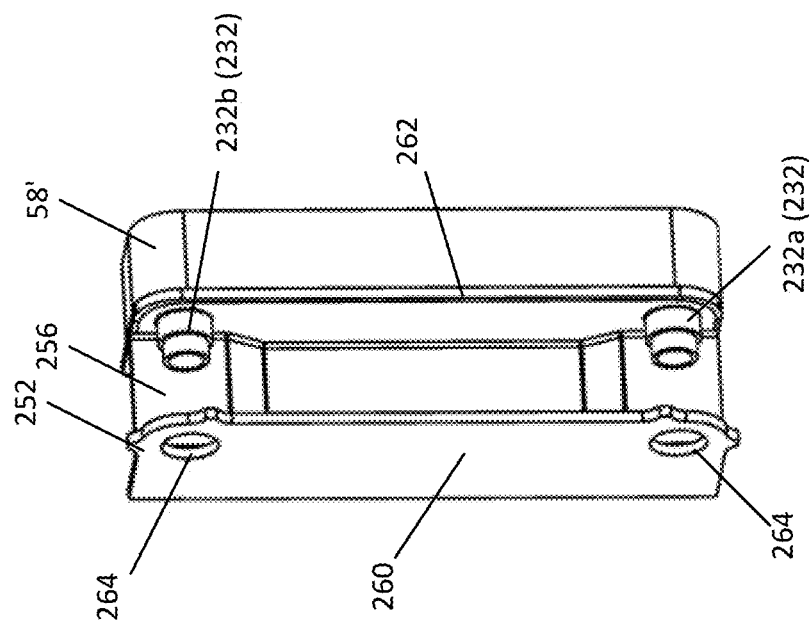
FIG. 12 is another perspective view of the heat exchanger and spacer supported within the housing of FIG. 7.

Now referring to FIGS. 11 and 12, a spacer 252 included within the housing 200 is illustrated assembled to the heat exchanger 58' and connections 220. For example, the spacer 252 may be a gasket similar to gasket 122. The spacer 252 may engage the face 248 of the heat exchanger 58'.

The spacer 252 may be an H-shaped spacer 252 with a first wall 256 separating the first set of connections 224 from the second set of connections 242. The first wall 256 may seal and protect the first set of connections 224 from the second set of connections 242. The spacer 252 may include a second wall 258 and a third wall that extend orthogonal to the first wall 256 on opposing sides of the first wall 256. The second wall 258 may be directly adjacent the face 248 of the heat exchanger 58'. The third wall 260 may be disposed on an opposing side of the first set of connections 224 and the second set of connections 242 from the heat exchanger 58'. The third wall 260 may seal and protect the first set of connections 224 and the second set of connections 242 from the external environment. The spacer 252 may be formed of a plastic, a ceramic, a metal, or any other suitable material.

A first front gasket 262 may be disposed between the spacer 252 and the heat exchanger 58'. The first front gasket 262 may be directly adjacent the front face 248 of the heat exchanger 58' on one face and directly adjacent the second wall 258 of the spacer 252 on an opposite face. The first front gasket 262 may seal and protect the heat exchanger 58' and the fluid entering and exiting the heat exchanger 58' through the connections 232 and 224, and, more specifically, the first set of connections 232 from the indoor fluid loop 14. The first front gasket 262 may include apertures 266 for receiving the connections 232, 224. The first front gasket 262 may separate the outdoor environment from the heat exchanger 58' and may insulate the heat exchanger 58' from the outdoor temperature. The first front gasket 262 may be formed of any gasket material compatible with the working fluid from the indoor fluid loop 14 and the outdoor fluid loop 18. For example, the gasket material may be an elastomer, such as neoprene or rubber, or any other gasket material.

The first set of connections 224 may include an elbow that routes the connections 224 in a direction opposite the first wall 256 of the spacer. The second set of connections 232 may extend through apertures 264 in the third wall 260 of the spacer 252.

Figure 13:
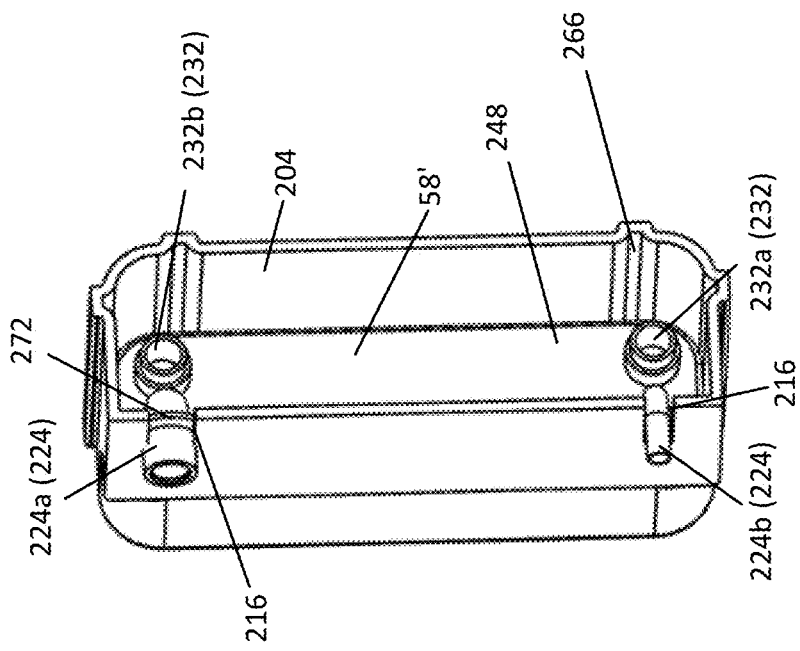
FIG. 13 is a perspective view of a heat exchanger supported within the housing of FIG. 7.

Referring to FIG. 13, the heat exchanger 58' is illustrated assembled into the outer casing 204. The outer casing 204 may define an interior space 268 in which the heat exchanger 58' is supported. The first set of connections 224 may extend away from the face 248 of the heat exchanger 58', bend at a 90° elbow, and extend through apertures 216 in the outer casing 204 in a direction parallel with a plane on the face 248 of the heat exchanger 58'. The second set of connections 232 may extend away from the face 248 of the heat exchanger 58' in a direction orthogonal to the plane on the face 248 of the heat exchanger 58'.

The outer casing 204 may include one or more channels 266. For example, there may be a pair of channels 266 disposed in the outer casing 204 opposite the apertures 216. Additionally, there may be channels 266 disposed on opposing ends of the outer casing 204. Alternatively, there may only be one channel, or more than two channels, disposed on any of the walls of the outer casing 204. The channels 266 may position the heat exchanger 58' within the outer casing 204. For example, guides (not illustrated) may be positioned on the heat exchanger 58' that engages with the channels 266 to position the heat exchanger 58'. Additionally, or alternatively, the channels 266 provide a gap for a heater (not shown) to be positioned within the outer casing 204. Additionally, or alternatively, the channels 266 may provide structural rigidity to the outer casing 204.

Figure 14:
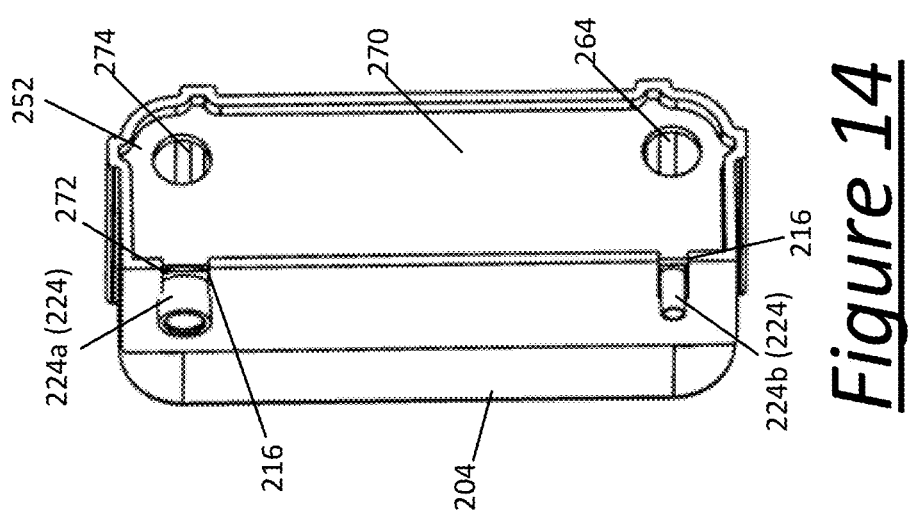
FIG. 14 is a perspective view of a heat exchanger and spacer supported within the housing of FIG. 7.

Now referring to FIG. 14, a second front gasket 270 may be disposed between the spacer 252 and the lid 208. The second front gasket 270 may be directly adjacent the third wall 260 of the spacer 252 on one face and directly adjacent the lid 208 on an opposite face. The second front gasket 270 may seal and protect the heat exchanger 58' and the fluid entering and exiting the heat exchanger 58' through the connections 232 and 224, and, more specifically, the first set of connections 232 from the indoor fluid loop 14. The second front gasket 270 may include apertures 274 for receiving the connections 232, 224. The second front gasket 270 may separate the outdoor environment from the connections 232, 224 and the heat exchanger 58' and may insulate the connections 232, 224 and heat exchanger 58' from the outdoor temperature. The second front gasket 270 may be formed of any gasket material compatible with the working fluid from the indoor fluid loop 14 and the outdoor fluid loop 18. For example, the gasket material may be an elastomer, such as neoprene or rubber, or any other gasket material.

An o-ring or seal 272 may be disposed adjacent the aperture 216 in the outer casing 204 between the second front gasket 270 and the outer casing 204 to seal the aperture 216 around the connection 220. Alternatively, the connection 220 may not need an additional seal.

While not shown, the housing 200 may also include a rear gasket or rear spacer to protect and insulate the heat exchanger 58'.

Figure 15A:
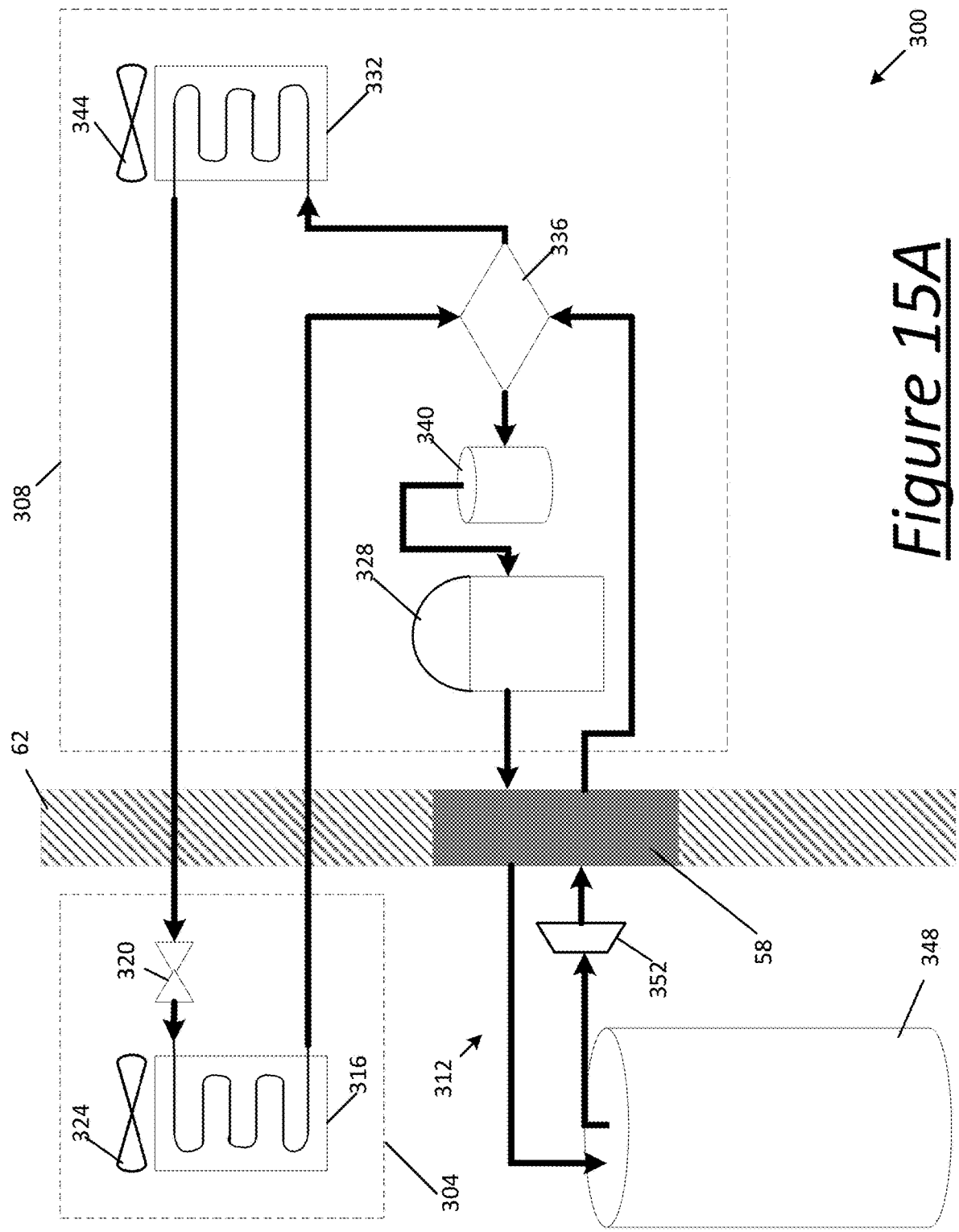
FIG. 15A is a schematic illustration of another example refrigeration system according to the present disclosure during a cooling mode.
Figure 15B:
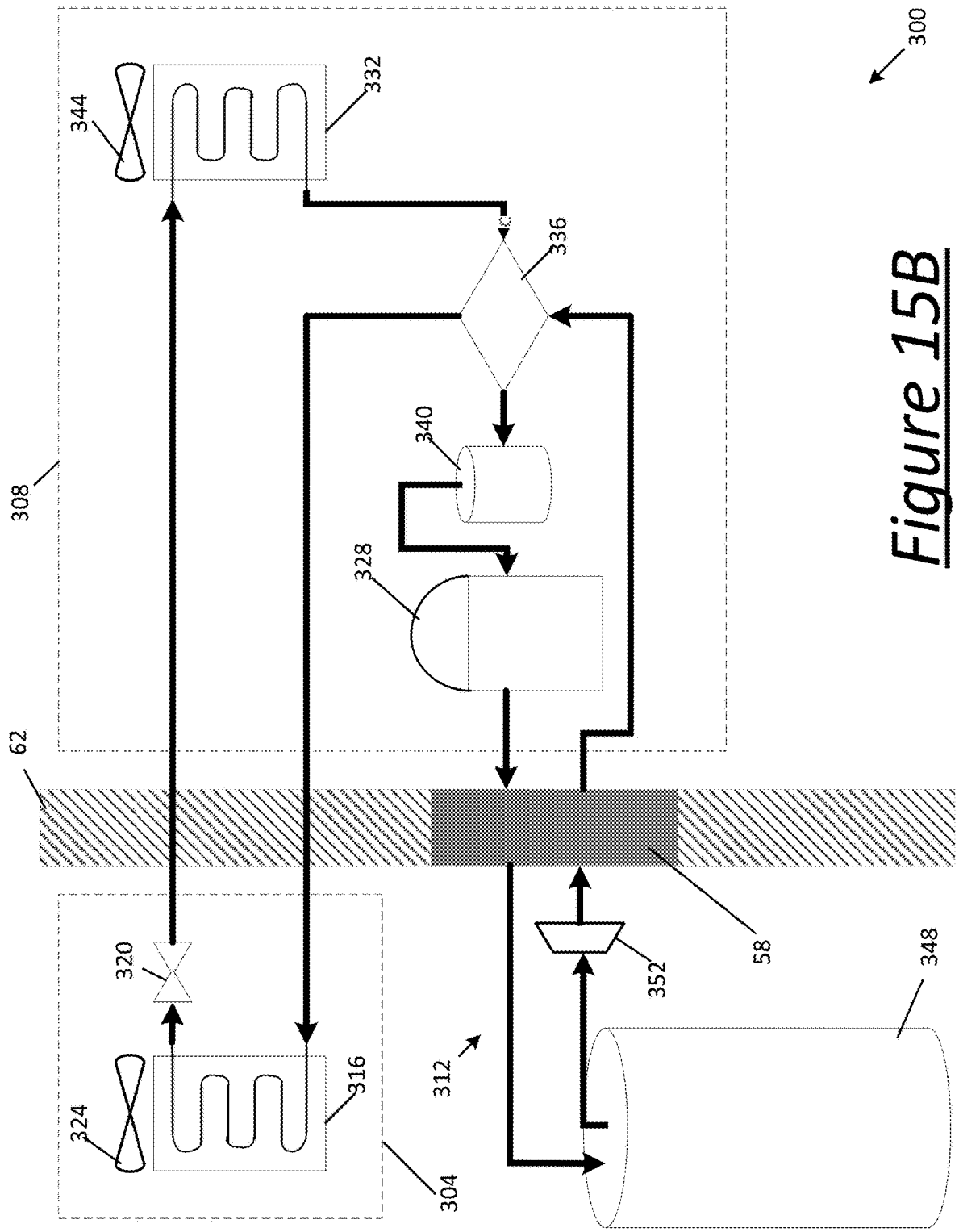
FIG. 15B is a schematic illustration of the example refrigeration system of FIG. 15A during a heating mode.

Now referring to FIGS. 15A and 15B, another example refrigeration system 300 having the heat exchanger 58, 58' mounted in the wall 62 of the building structure includes an indoor fluid loop 304, an outdoor fluid loop 308, and a hot water storage tank loop 312. The refrigeration system 300 may be an HVAC system or a heat-pump system. The refrigeration system 300 may be operable in a cooling mode (FIG. 15A) and in a heating mode (FIG. 15B).

The indoor fluid loop 304 may be disposed within the structure of the building and may circulate a first working fluid with the outdoor fluid loop 308 that is disposed outside of the structure of the building. The hot water storage tank loop 312 may be isolated inside of the structure of the building, separate from the indoor fluid loop 304, and may circulate a second working fluid. For example, the first working fluid may be different from the second working fluid. Alternatively, the first working fluid may be the same as the second working fluid.

The first working fluid may be a non-flammable working fluid. For example, the first working fluid may contain a non-flammable refrigerant. In certain variations, exemplary non-flammable refrigerants include those selected from the group consisting of: saturated or unsaturated fluorocarbons, chlorofluorocarbons, hydrochlorofluorocarbons (which is phased out by the Montreal Protocol in member countries), fluoroethers, carbon dioxide, combinations thereof. Alternatively, the first working fluid may be water.

The second working fluid may include a refrigerant that is different from the first working fluid. For example, the second working fluid may be water.

The indoor fluid loop 304 includes an indoor heat exchanger 316 and an expansion valve 320 and circulates the first working fluid. In the cooling mode (FIG. 15A), the indoor heat exchanger 316 may receive the first working fluid from the expansion valve 320. In the heating mode (FIG. 15B), the indoor heat exchanger 316 may provide the first working fluid to the expansion valve 320.

Referring first to the cooling mode in FIG. 15A, the expansion valve 320 controls the flow rate of the working fluid. The expansion valve 320 may be a bi-directional valve such that the expansion valve 320 operates in both the heating mode and the cooling mode. Alternatively, the indoor fluid loop 304 and outdoor fluid loop 308 may include two expansion valves 320, two bypass lines, and two check valves, such that one bypass line and one expansion valve operates in each of the heating mode and the cooling mode, with the check valves operating to prevent flow to the unused expansion valve.

The expansion valve 320 may include a thermostatic expansion valve, may be controlled electronically by, for example, a system controller, or may have a fixed restriction like a capillary tube. A pressure drop caused by the expansion valve 320 may cause a portion of the working fluid to be provided to the indoor heat exchanger 316 in a liquefied form.

The working fluid absorbs heat in the indoor heat exchanger 316. The indoor heat exchanger 316 may include an electric fan 324 that increases the rate of heat transfer to the working fluid. The heat is removed from air flowing across the indoor heat exchanger 316 and the resulting cooled air is circulated through the building. The indoor heat exchanger 316 may be a liquid-to-air heat exchanger, such that the working fluid does not change phases within the indoor heat exchanger 316. The indoor heat exchanger 316 may be a brazed-plate heat exchanger, another plate heat exchanger, or any other type of heat exchanger.

The indoor fluid loop 304 may communicate or circulate the first working fluid with the outdoor fluid loop 308. The outdoor fluid loop 308 may include a compressor 328, an outdoor heat exchanger 332, a reversing valve 336, and a suction line accumulator 340. Working fluid is provided to the outdoor heat exchanger 332 via the reversing valve 336.

All or a portion of the pressurized working fluid is converted into liquid form within the outdoor heat exchanger 332. The outdoor heat exchanger 332 transfers heat away from the working fluid, thereby cooling the working fluid. When the refrigerant vapor is cooled to a temperature that is less than a saturation temperature, the working fluid transforms into a liquid (or liquefied) working fluid. The outdoor heat exchanger 332 may include an electric fan 344 that increases the rate of heat transfer away from the working fluid. The outdoor heat exchanger 332 may be a brazed-plate heat exchanger, another plate heat exchanger, or any other type of heat exchanger. The outdoor heat exchanger 38 provides the working fluid to the expansion valve 320 (in the indoor fluid loop 304).

The reversing valve 336 receives the working fluid in vapor form from the evaporator 316 (in the indoor fluid loop 304) and provides the working fluid to the compressor 328, via the suction line accumulator 340. The suction line accumulator 340 prevents compressor damage from a sudden surge of fluid that could enter the compressor 328. The compressor 328 compresses the working fluid, providing pressurized working fluid in vapor form. The compressor 328 includes an electric motor and may be a scroll compressor or a reciprocating compressor.

The working fluid from the compressor 328 is circulated through the heat exchanger 58 and returned to the reversing valve 336 and outdoor heat exchanger 332.

Now referring to the heating mode in FIG. 15B, the compressor 328 receives the working fluid from the suction line accumulator 340. The compressor 328 compresses the working fluid, providing pressurized working fluid in vapor form to the reversing valve 336.

The reversing valve 336 routes the vaporized working fluid to the indoor heat exchanger 316 through the wall 62. The working fluid transfers heat to the indoor air. Vaporized working fluid transitions into liquid form when cooled to a temperature that is less than the saturation temperature of the working fluid. The electric fan 324 may increase the rate of heat transfer from the working fluid. The heat is removed from the working fluid and absorbed by the air flowing across the indoor heat exchanger 316 and the resulting heated air is circulated through the building.

The liquid working fluid is provided to the expansion valve 42 as a liquid or liquid-vapor mixture. The expansion valve increases the pressure of the working fluid. The working fluid is provided to the outdoor heat exchanger 332 through the wall 62 of the building.

The working fluid absorbs heat in the outdoor heat exchanger 332. If the temperature of the working fluid is increased to a temperature greater than the saturation temperature, the liquid working fluid transitions into vapor form. The electric fan 344 may increase the rate of heat transfer to the working fluid. The heat is removed from air flowing across the outdoor heat exchanger 332 and absorbed by the working fluid. The working fluid is then provided back to the reversing valve 336.

Referring to FIGS. 15A and 15B, the hot water storage tank loop 312 includes a hot water storage tank 348 and a pump 352. The hot water storage tank 348 may be a thermal energy storage (TES) tank or other hot water storage tank. Regardless of the heating mode or the cooling mode, the hot water storage tank 348 may receive hot working fluid from the heat exchanger 58. The working fluid may be in liquid or vapor form. Working fluid may be pumped from the hot water storage tank 348 by the pump 352.

The pump 352 may pump the working fluid through the heat exchanger 58 and through a complete circulation of the hot water storage tank loop 312. For example, the pump 352 may be a centrifugal, plunger, diaphragm, or any other suitable pump.

The working fluid of the hot water storage tank loop 312 and the working fluid of the outdoor fluid loop 308 may exchange heat in the heat exchanger 58 mounted within the wall 62 of the structure of the building. The working fluid of the hot water storage tank loop 312 enters the heat exchanger 58 from the pump 352 in a liquid form. The working fluid of the outdoor fluid loop 308 enters the heat exchanger 58 from the compressor 328 in a vapor form or in a mixed liquid and vapor form. The heat from the first working fluid of the outdoor fluid loop 308 is absorbed by the second working fluid of the hot water storage tank loop 312.

Figure 16A:
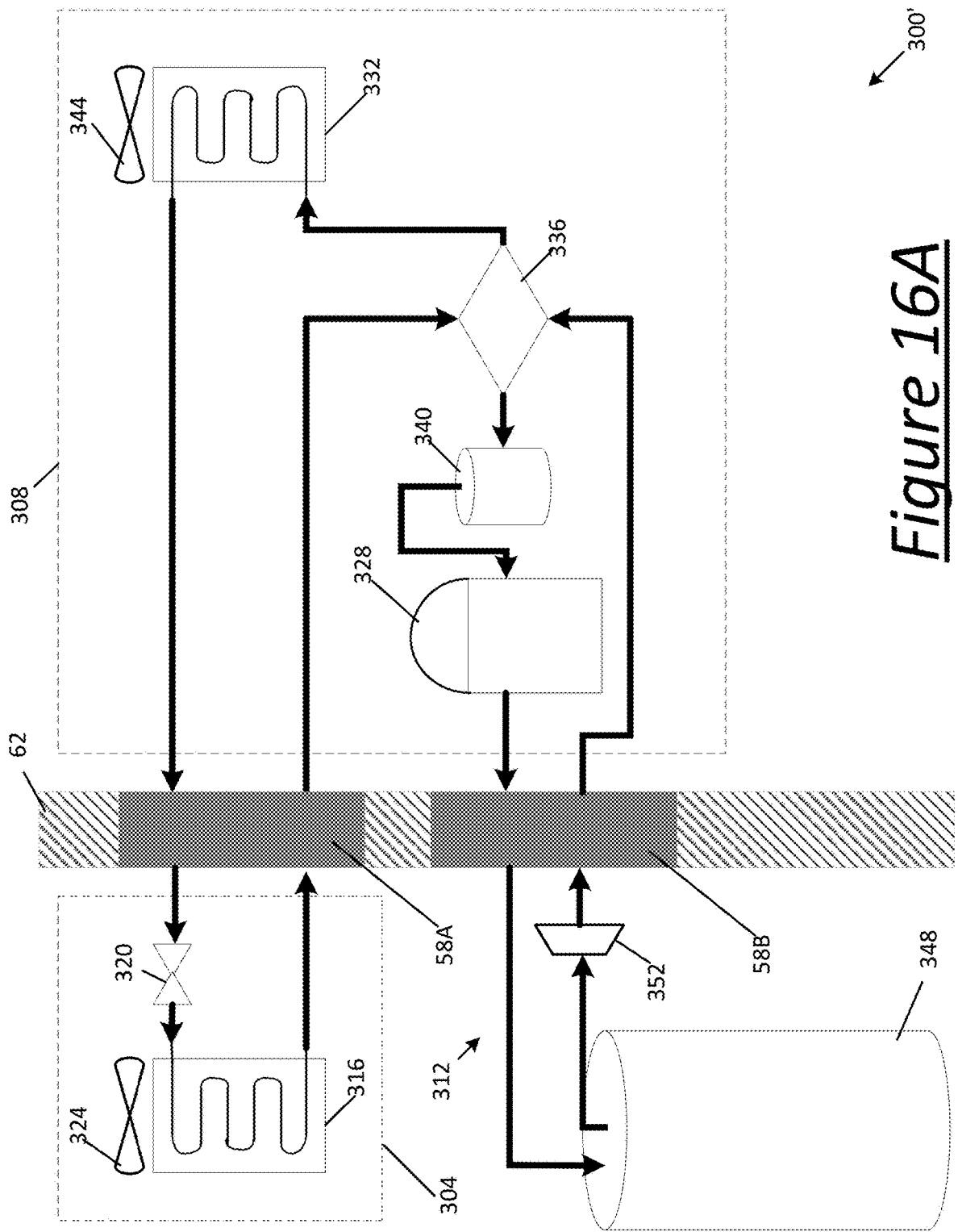
FIG. 16A is a schematic illustration of another example refrigeration system according to the present disclosure during a cooling mode.
Figure 16B:
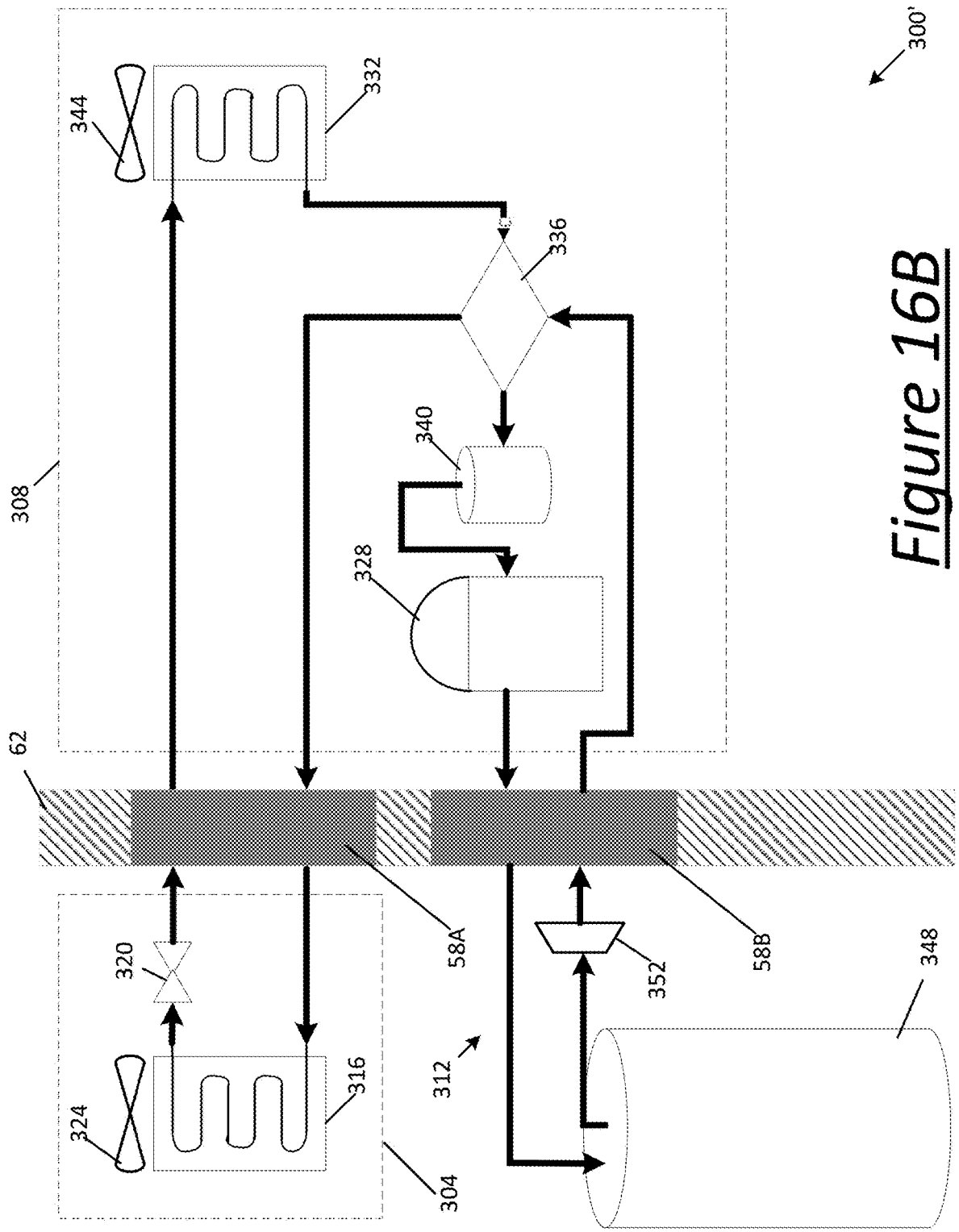
FIG. 16B is a schematic illustration of the example refrigeration system of FIG. 16A during a heating mode.

Referring to FIGS. 16A and 16B, in an alternative example, the refrigeration system 300' may include two heat exchangers 58A and 58B, similar to heat exchangers 58, 58', mounted within the wall 62, and the indoor fluid loop 304 may be separate and isolated from the outdoor fluid loop 308. FIG. 16A may illustrate the refrigeration system 300' in a cooling mode, and FIG. 16B may illustrate the refrigeration system 300' in a heating mode. Heat exchanger 58A transfers heat between the working fluid of the indoor fluid loop 304 and the outdoor fluid loop 308, similar to the example of FIGS. 1A and 1B. Heat exchanger 58B transfers heat between the working fluid of the hot water storage tank loop 312 and the outdoor fluid loop 308, similar to the example of FIGS. 15A and 15B.

The indoor fluid loop may circulate a working fluid including a non-flammable refrigerant. In certain variations, exemplary non-flammable refrigerants include those selected from the group consisting of: saturated or unsaturated fluorocarbons, chlorofluorocarbons, hydrochlorofluorocarbons (which may be phased out by the Montreal Protocol for member countries), fluoroethers, carbon dioxide, and combinations thereof. Alternatively, the first working fluid may be water.

The outdoor fluid loop may circulate a working fluid including a low global warming potential (LGWP) refrigerant. The LGWP refrigerant may be a flammable refrigerant, as previously described.

The hot water storage tank loop 312 may circulate a working fluid that is water.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refrigeration system comprising:
an indoor fluid loop circulating a first working fluid;
an outdoor fluid loop circulating a second working fluid, the second working fluid being different from the first working fluid, the outdoor fluid loop being separated from the indoor fluid loop by a wall of a structure; and
a heat exchanger assembly mounted within the wall of the structure, the heat exchanger assembly including a heat exchanger and a housing, the heat exchanger being disposed within an internal space defined by the housing, the housing supporting the heat exchanger within the internal space, and the housing being mounted to the wall of the structure.

2. The refrigeration system of claim 1, wherein the heat exchanger includes a first pair of fluid connections that extend through a first face of the wall of the structure and connect to the indoor fluid loop.

3. The refrigeration system of claim 2, wherein the heat exchanger includes a second pair of fluid connections that extend through a second face of the wall to an external environment and connect to the outdoor fluid loop.

4. The refrigeration system of claim 3, further comprising:
a gasket disposed within the internal space of the housing, the gasket being configured to seal the heat exchanger.

5. The refrigeration system of claim 4, further comprising:
a spacer being disposed within the housing, wherein
the spacer is an H-shaped spacer and includes a first wall and a second wall, the second wall extending orthogonal to the first wall, and
the first wall of the spacer separates the first pair of fluid connections from the second pair of fluid connections.

6. The refrigeration system of claim 5, wherein one of the first pair of fluid connections and the second pair of fluid connections extends through apertures in the second wall of the spacer.

7. The refrigeration system of claim 1, further comprising:
a gasket disposed within the internal space of the housing, the gasket being configured to seal the heat exchanger.

8. The refrigeration system of claim 7, wherein
the housing includes an outer casing and a lid,
the heat exchanger is disposed within the outer casing, and
the gasket is disposed between the heat exchanger and the lid.

9. The refrigeration system of claim 8, wherein
the heat exchanger includes a first set of fluid connections and a second set of fluid connections, the first set of fluid connections being in fluid communication with the indoor fluid loop and the second set of fluid connections being in fluid communication with the outdoor fluid loop, and
one of the first set of fluid connections and the second set of fluid connections extends through the gasket and the lid.

10. The refrigeration system of claim 8, further comprising a second gasket disposed between the heat exchanger and the outer casing,
wherein the gasket disposed between the heat exchanger and the lid is a first gasket, and
the heat exchanger is disposed between the first gasket and the second gasket.

11. The refrigeration system of claim 1, wherein the heat exchanger is one of a brazed-plate heat exchanger, a plate and frame heat exchanger, and a concentric tube heat exchanger.

12. The refrigeration system of claim 1, where in the indoor fluid loop includes an indoor heat exchanger and a pump.

13. The refrigeration system of claim 1, wherein the outdoor fluid loop includes an outdoor heat exchanger and a compressor.

14. The refrigeration system of claim 1, wherein the indoor fluid loop includes a hot water storage tank and a pump.

15. The refrigeration system of claim 14, wherein the outdoor fluid loop is in communication with an outdoor heat exchanger and an expansion valve disposed external to the wall of the structure.

16. A thermal exchange system configured to be mounted within a wall of a structure, the wall of the structure isolating a fluid loop within the structure from a fluid loop external to the structure, the thermal exchange system comprising:

a housing defining an internal space, the housing including at least one fastener configured to secure the housing to the wall of the structure;
a heat exchanger supported within the internal space;
a gasket sealing the heat exchanger and internal space;
a first fluid inlet connection and a first fluid outlet connection configured to be in fluid communication with the fluid loop within the structure, the first fluid inlet connection and the first fluid outlet connection being configured to direct flow of a first work in fluid into and out of the heat exchanger; and
a second fluid inlet connection and a second fluid outlet connection configured t be fluid communication with the fluid loop external to the structure, the second fluid inlet connection am the second fluid outlet connection being configured to direct flow of a second working fluid into and out of the heat exchanger.

17. The thermal exchange system of claim 16, wherein the heat exchanger is one of a brazed-plate heat exchanger, a plate and frame heat exchanger, and a concentric tube heat exchanger,
the heat exchanger includes a first passage configured to direct the first working fluid to flow in a first direction, and
the heat exchanger includes a second passage configured to direct the second working fluid to flow in a second direction, the second direction being opposite the first direction.

18. The thermal exchange system of claim 16, further comprising:
a spacer being disposed within the internal space, wherein the spacer is an H-shaped spacer including a first wall and a second wall, the second wall extending orthogonal to the first wall, and
the first wall separates the first fluid inlet connection and the first fluid outlet connection from the second fluid inlet connection and the second fluid outlet connection.

19. The thermal exchange system of claim 16, further comprising:
a second gasket sealing the heat exchanger and the internal space, wherein
the housing includes an outer casing and a lid,
the gasket is a first gasket disposed between the heat exchanger and the lid,
the second gasket is disposed between the heat exchanger and the outer casing,
and the heat exchanger is disposed between the first gasket and the second gasket.

20. A thermal exchange system configured to be mounted within a wall of a structure, the wall of the structure isolating a fluid loop within the structure from a fluid loop external to the structure, the thermal exchange system comprising:
a housing defining an internal space, the housing including at least one fastener configured to secure the housing to the wall of the structure;
a heat exchanger supported within the internal space;
a gasket sealing the heat exchanger and internal space; and
a second gasket sealing the heat exchanger and the internal space, wherein
the housing includes an outer casing and a lid,
the gasket is a first gasket disposed between the heat exchanger and the lid,
the second gasket is disposed between the heat exchanger and the outer casing,
and the heat exchanger is disposed between the first gasket and the second gasket.

* * * * *